US011234222B2

(12) United States Patent
Wang et al.

(10) Patent No.: US 11,234,222 B2
(45) Date of Patent: Jan. 25, 2022

(54) CONFIGURATION METHOD AND APPARATUS FOR UPLINK CONTROL CHANNEL TRANSMISSION

(71) Applicant: HUAWEI TECHNOLOGIES CO., LTD., Guangdong (CN)

(72) Inventors: Da Wang, Shenzhen (CN); Jian Wang, Beijing (CN); Yun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 16/475,922

(22) PCT Filed: Jul. 24, 2017

(86) PCT No.: PCT/CN2017/094127
§ 371 (c)(1),
(2) Date: Aug. 28, 2019

(87) PCT Pub. No.: WO2018/126647
PCT Pub. Date: Jul. 12, 2018

(65) Prior Publication Data

US 2019/0349921 A1 Nov. 14, 2019

(30) Foreign Application Priority Data

Jan. 6, 2017 (WO) ................ PCT/CN2017/070498

(51) Int. Cl.
*H04W 4/00* (2018.01)
*H04W 72/04* (2009.01)
*H04W 72/12* (2009.01)

(52) U.S. Cl.
CPC ..... *H04W 72/0413* (2013.01); *H04W 72/044* (2013.01); *H04W 72/1284* (2013.01)

(58) Field of Classification Search
CPC ........... H04W 72/0413; H04W 72/044; H04W 72/1284; H04W 72/12; H04W 72/04
See application file for complete search history.

(56) References Cited

U.S. PATENT DOCUMENTS 9,854,569 B2 * 12/2017 Yang .................... H04W 16/14
2008/0200196 A1 8/2008 Muharemovic et al.
(Continued)

FOREIGN PATENT DOCUMENTS

CN 101640585 A 2/2010
CN 102111886 A 6/2011
(Continued)

OTHER PUBLICATIONS

Office Action issued in Korean Application No. 2019-7022638 dated Aug. 7, 2020, 8 pages (with English translation).
(Continued)

*Primary Examiner* — Abdelnabi O Musa
(74) *Attorney, Agent, or Firm* — Fish & Richardson P.C.

(57) ABSTRACT

Embodiments of this application provide an uplink control channel transmission method and apparatus. At least one first-format uplink control channel and at least one second-format uplink control channel are generated, and the at least one first-format uplink control channel and the at least one second-format uplink control channel are transmitted in the first timeslot or subframe. In the process, there are only two formats of uplink control channels, so that uplink scheduling complexity is reduced.

16 Claims, 23 Drawing Sheets

(56) References Cited

U.S. PATENT DOCUMENTS

| | | | | |
|---|---|---|---|---|
| 2012/0243497 | A1* | 9/2012 | Chung | H04L 1/1861 370/329 |
| 2013/0010688 | A1 | 1/2013 | Yi et al. | |
| 2013/0301571 | A1* | 11/2013 | Sorrentino | H04L 5/001 370/329 |
| 2017/0134117 | A1* | 5/2017 | Tan Bergstrom | H04W 72/0453 |
| 2017/0215201 | A1* | 7/2017 | Kim | H04L 1/1812 |
| 2017/0289993 | A1* | 10/2017 | Yerramalli | H04W 72/0446 |
| 2018/0310298 | A1* | 10/2018 | Li | H04L 1/1812 |

FOREIGN PATENT DOCUMENTS

| | | | |
|---|---|---|---|
| CN | 103384183 | A | 11/2013 |
| CN | 103427940 | A | 12/2013 |
| CN | 104426633 | A | 3/2015 |
| CN | 106257856 | A | 12/2016 |
| CN | 106301695 | A | 1/2017 |
| KR | 20120135293 | A | 12/2012 |
| WO | 2011084020 | A2 | 7/2011 |
| WO | 2016175172 | A1 | 11/2016 |

OTHER PUBLICATIONS

LG Electronics et al., "WF on UL control channel for NR",3GPP TSG RAN WG1 #87,Reno, USA,R1-1613412, Nov. 14-18, 2016, 2 pages.

Ericsson, "Summary of offline discussion on UL control channels",R1-1613721, Nov. 19, 2016, 13 pages.

Motorola Mobility, "Discussion on UCI transmission in NR",3GPP TSG RAN WG1 Meeting #87,Reno, Nevada, USA, R1-1612747, Nov. 14-18, 2016, 4 pages.

Qualcomm Incorporated, "Uplink Control Channel Design for Shortened TTI",3GPP TSG RAN WG1 #87,Reno, USA, R1-1611639, Nov. 14-18, 2016, 9 pages.

CMCC, "Further discussion on uplink control channel design for NR",3GPP TSG RAN WG1 Meeting #87,Reno, USA, R1-1612191, Oct. 14-18, 2016, 5 pages.

Huawei, "Signalling design for UL control resource in NR",3GPP TSG RAN WG1 Meeting #87,Reno, USA, R1-1611213, Nov. 14-18, 2016, 4 pages.

Extended European Search Report issued in European Application No. 17889559.5 dated Nov. 20, 2019, 12 pages.

Intel Corporation, "UL control channel design with long duration," 3GPP TSG-RAN WG1 #87, R1-1611995, Reno, USA, Nov. 14-18, 2016, 5 pages.

LG Electronics, "Overall structure of UL control channel for NR," 3GPP TSG RAN WG1 Meeting #87, R1-1611840 , Reno, USA Nov. 14-18, 2016, 6 pages.

Office Action issued in Japanese Application No. 2019-536591 dated Sep. 15, 2020, 5 pages (with English ranslation).

Office action issued in Chinese Application No. 201780082210.1 dated Dec. 31, 2019, 15 pages (With English Translation).

PCT International Search Report and Written Opinion issued in International Application No. PCT/CN2017/070,498, dated Sep. 27, 2017, 11 pages.

PCT International Search Report and Written Opinion issued in International Application No. PCT/CN2017/094,127 dated Sep. 28, 2017, 20 pages (With English Translation).

* cited by examiner

CONFIGURATION METHOD AND APPARATUS FOR UPLINK CONTROL CHANNEL TRANSMISSION

CROSS-REFERENCE TO RELATED APPLICATIONS

This application is a national stage of International Application No. PCT/CN2017/094127, filed Jul. 24, 2017, which claims priority to International Application No. PCT/CN2017/070498 filed on Jan. 6, 2017. Both of the aforementioned applications are hereby incorporated by reference in their entireties.

TECHNICAL FIELD

Embodiments of this application relate to the field of communications technologies, and in particular, to an uplink control channel transmission method and apparatus.

BACKGROUND

In a Long Term Evolution (Long Term Evolution, LTE) communications system, a terminal sends uplink control information to a network side device by using an uplink control channel. The uplink control information is used to feed back an acknowledgement of downlink data, a channel status, or the like to the network side device. The uplink control channel occupies 14 symbols (symbol) of a subframe (also referred to as a timeslot) in time domain, and occupies physical resource blocks (Physical Resource Block, PRB) at two ends of system bandwidth in frequency domain. A combination manner of a time-frequency resource occupied by the uplink control channel is referred to as a format of the uplink control channel. It can be learned from the foregoing that in LTE, the format of the uplink control channel is fixed, and the network side device does not need to send signaling to the terminal to indicate the format of the uplink control channel.

In future 5th Generation Mobile Communication (the 5th Generation Mobile Communication, 5G), an uplink control channel includes two types: a short duration uplink control (short duration UL control) channel and a long duration uplink control (long duration UL control) channel. The short duration UL control channel needs to occupy one or two symbols. In addition, in 5G there are various types of timeslots or subframes used to carry an uplink control channel, such as a downlink domain (DL domain) timeslot or subframe, an uplink domain (UL domain) timeslot or subframe, and an uplink only (UL only) timeslot or subframe. Last one or two symbols of the DL domain timeslot or subframe is/are an uplink transmission resource, and is/are mainly used to transmit a short duration UL control channel. First two or three symbols of the UL domain timeslot or subframe are a downlink transmission resource and a gap (Gap), and remaining symbols are an uplink transmission resource. All symbols of the UL only timeslot or subframe are an uplink transmission resource. When uplink control channels are carried by using the UL domain timeslot or subframe or the UL only timeslot or subframe, formats of the uplink control channels are different, because the short duration UL control channel may occupy one or two symbols, the long duration UL control channel may occupy three to 14 symbols, and quantities of occupied symbols are different. In addition, subframes of a same type include different quantities of symbols. For example, a UL domain timeslot or subframe type includes a UL domain timeslot or subframe occupying seven symbols and a UL domain timeslot or subframe including 14 symbols. Therefore, when uplink control channels are carried by using different types of subframes, there are a plurality of formats of uplink control channels. This increases complexity of scheduling an uplink control channel.

SUMMARY

Embodiments of this application provide an uplink control channel transmission method and apparatus. Two different formats of uplink control channels are added to one timeslot or subframe, to reduce complexity of scheduling an uplink control channel.

According to a first aspect, an embodiment of this application provides an uplink control channel transmission method. In the method, at least one first-format uplink control channel and at least one second-format uplink control channel are added to a first timeslot or subframe, and then the first timeslot or subframe including the at least one first-format uplink control channel and the at least one second-format uplink control channel is transmitted.

According to the foregoing method, there are only two formats of uplink control channels in a timeslot or subframe, so that uplink scheduling complexity is reduced.

In a feasible design, a symbol occupied by at least one of the at least one first-format uplink control channel is completely different from or partially the same as a symbol occupied by at least one of the at least one second-format uplink control channel.

In the method, flexible configuration of a time domain resource occupied by uplink control channels in two different formats is implemented.

In a feasible design, at least one of the at least one first-format uplink control channel occupies a first frequency resource, at least one of the at least one second-format uplink control channel occupies a second frequency resource, and the first frequency resource is completely different from or partially the same as the second frequency resource.

Further, the first frequency resource occupies two ends of a system frequency band, and the second frequency resource occupies all or a part of the system frequency band, or the second frequency occupies a part of the system frequency band except the first frequency resource.

In the method, flexible configuration of a frequency resource occupied by uplink control channels in two different formats is implemented.

In a feasible design, the first timeslot or subframe further includes at least one third-format uplink control channel; and a symbol occupied by at least one of the at least one third-format uplink control channel is completely different from or partially the same as the symbol occupied by the at least one of the at least one first-format uplink control channel; or a symbol occupied by at least one of the at least one third-format uplink control channel is completely different from or partially the same as the symbol occupied by the at least one of the at least one second-format uplink control channel.

In the method, there are only three formats of uplink control channels, so that uplink scheduling complexity is reduced, and flexible configuration of a time domain resource occupied by the uplink control channels in the three different formats is implemented.

In a feasible design, the at least one of the at least one first-format uplink control channel occupies the first frequency resource, the at least one of the at least one second-format uplink control channel occupies the second frequency resource, the at least one third-format uplink control channel of the at least one third-format uplink control channel format occupies a third frequency resource, and the first frequency resource is completely different from or partially the same as the second frequency resource; and the third frequency resource is completely different from or partially the same as the first frequency resource, or the third frequency resource is completely different from or partially the same as the second frequency resource.

In a feasible design, the third frequency occupies all or a part of the system frequency band, or the third frequency occupies a part of the system frequency band except the first frequency resource and the second frequency resource.

In a feasible design, the first-format uplink control channel, the second-format uplink control channel, or the third-format uplink control channel occupies at least two parts of frequency resources, and at least two of the at least two parts of frequency resources are different.

In the method, frequency diversity gains are implemented.

In a feasible design, the at least one first-format uplink control channel is specifically one first-format uplink control channel, and the at least one second-format uplink control channel is specifically one second-format uplink control channel, where the first-format uplink control channel occupies seven symbols of the first timeslot or subframe, the second-format uplink control channel occupies four symbols of the first timeslot or subframe, and the seven symbols are completely different from or partially the same as the four symbols in the first timeslot or subframe; or the first-format uplink control channel occupies 10 symbols of the first timeslot or subframe, the second-format uplink control channel occupies one symbol of the first timeslot or subframe, and the 10 symbols are completely different from or partially the same as the one symbol in the first timeslot or subframe; or the first-format uplink control channel occupies 11 symbols of the first timeslot or subframe, the second-format uplink control channel occupies one symbol of the first timeslot or subframe, and the 11 symbols are completely different from or partially the same as the one symbol in the first timeslot or subframe; or the first-format uplink control channel occupies 13 symbols of the first timeslot or subframe, the second-format uplink control channel occupies one symbol of the first timeslot or subframe, and the 13 symbols are completely different from or partially the same as the one symbol in the first timeslot or subframe; or the first-format uplink control channel occupies six symbols of the first timeslot or subframe, the second-format uplink control channel occupies one symbol of the first timeslot or subframe, and the six symbols are completely different from or partially the same as the one symbol in the first timeslot or subframe; or the first-format uplink control channel occupies four symbols of the first timeslot or subframe, the second-format uplink control channel occupies one symbol of the first timeslot or subframe, and the four symbols are completely different from or partially the same as the one symbol in the first timeslot or subframe; or the first-format uplink control channel occupies three symbols of the first timeslot or subframe, the second-format uplink control channel occupies one symbol of the first timeslot or subframe, and the three symbols are completely different from or partially the same as the one symbol in the first timeslot or subframe.

In a feasible design, the at least one first-format uplink control channel is specifically one first-format uplink control channel, the at least one second-format uplink control channel is specifically four second-format uplink control channels, the first-format uplink control channel occupies seven symbols of the first timeslot or subframe, each of the four second-format uplink control channels occupies one symbol of the first timeslot or subframe, and the seven symbols are completely different from or partially the same as the one symbol in the first timeslot or subframe; or the at least one first-format uplink control channel is specifically one first-format uplink control channel, the at least one second-format uplink control channel is specifically five second-format uplink control channels, the first-format uplink control channel occupies seven symbols of the first timeslot or subframe, each of the five second-format uplink control channels occupies one symbol of the first timeslot or subframe, and the seven symbols are completely different from or partially the same as the one symbol in the first timeslot or subframe.

In a feasible design, the at least one first-format uplink control channel is specifically one first-format uplink control channel, the at least one second-format uplink control channel is specifically one second-format uplink control channel, the at least one third-format uplink control channel is specifically one third-format uplink control channel, the first-format uplink control channel occupies seven symbols of the first timeslot or subframe, the second-format uplink control channel occupies four symbols of the first timeslot or subframe, the third-format uplink control channel occupies one symbol of the first timeslot or subframe, and the seven symbols, the four symbols, and the one symbol are completely different or partially the same in the first timeslot or subframe.

According to a second aspect, an embodiment of this application provides an uplink control channel transmission apparatus, including:

a processing module, configured to generate a first timeslot or subframe including at least one first-format uplink control channel and at least one second-format uplink control channel, where the first-format uplink control channel occupies N symbols of the first timeslot or subframe, the second-format uplink control channel occupies M symbols of the first timeslot or subframe, and N is greater than or equal to M; and a transceiver module, configured to transmit the first timeslot or subframe.

In a feasible design, a symbol occupied by at least one of the at least one first-format uplink control channel is completely different from or partially the same as a symbol occupied by at least one of the at least one second-format uplink control channel.

In a feasible design, at least one of the at least one first-format uplink control channel occupies a first frequency resource, at least one of the at least one second-format uplink control channel occupies a second frequency resource, and the first frequency resource is completely different from or partially the same as the second frequency resource.

In a feasible design, the first frequency resource occupies two ends of a system frequency band, and the second frequency resource occupies all or a part of the system frequency band, or the second frequency occupies a part of the system frequency band except the first frequency resource.

In a feasible design, the first timeslot or subframe further includes at least one third-format uplink control channel; and a symbol occupied by at least one of the at least one third-format uplink control channel is completely different from or partially the same as the symbol occupied by the at least one of the at least one first-format uplink control channel; or a symbol occupied by at least one of the at least one third-format uplink control channel is completely different from or partially the same as the symbol occupied by the at least one of the at least one second-format uplink control channel.

In a feasible design, the at least one of the at least one first-format uplink control channel occupies the first frequency resource, the at least one of the at least one second-format uplink control channel occupies the second frequency resource, the at least one third-format uplink control channel of the at least one third-format uplink control channel format occupies a third frequency resource, and the first frequency resource is completely different from or partially the same as the second frequency resource; and the third frequency resource is completely different from or partially the same as the first frequency resource, or the third frequency resource is completely different from or partially the same as the second frequency resource.

In a feasible design, the third frequency occupies all or a part of the system frequency band, or the third frequency occupies a part of the system frequency band except the first frequency resource and the second frequency resource.

In a feasible design, the first-format uplink control channel, the second-format uplink control channel, or the third-format uplink control channel occupies at least two parts of frequency resources, and at least two of the at least two parts of frequency resources are different.

In a feasible design, the at least one first-format uplink control channel is specifically one first-format uplink control channel, and the at least one second-format uplink control channel is specifically one second-format uplink control channel, where the first-format uplink control channel occupies seven symbols of the first timeslot or subframe, the second-format uplink control channel occupies four symbols of the first timeslot or subframe, and the seven symbols are completely different from or partially the same as the four symbols in the first timeslot or subframe; or the first-format uplink control channel occupies 10 symbols of the first timeslot or subframe, the second-format uplink control channel occupies one symbol of the first timeslot or subframe, and the 10 symbols are completely different from or partially the same as the one symbol in the first timeslot or subframe; or the first-format uplink control channel occupies 11 symbols of the first timeslot or subframe, the second-format uplink control channel occupies one symbol of the first timeslot or subframe, and the 11 symbols are completely different from or partially the same as the one symbol in the first timeslot or subframe; or the first-format uplink control channel occupies 13 symbols of the first timeslot or subframe, the second-format uplink control channel occupies one symbol of the first timeslot or subframe, and the 13 symbols are completely different from or partially the same as the one symbol in the first timeslot or subframe; or the first-format uplink control channel occupies six symbols of the first timeslot or subframe, the second-format uplink control channel occupies one symbol of the first timeslot or subframe, and the six symbols are completely different from or partially the same as the one symbol in the first timeslot or subframe; or the first-format uplink control channel occupies four symbols of the first timeslot or subframe, the second-format uplink control channel occupies one symbol of the first timeslot or subframe, and the four symbols are completely different from or partially the same as the one symbol in the first timeslot or subframe; or the first-format uplink control channel occupies three symbols of the first timeslot or subframe, the second-format uplink control channel occupies one symbol of the first timeslot or subframe, and the three symbols are completely different from or partially the same as the one symbol in the first timeslot or subframe.

In a feasible design, the at least one first-format uplink control channel is specifically one first-format uplink control channel, the at least one second-format uplink control channel is specifically four second-format uplink control channels, the first-format uplink control channel occupies seven symbols of the first timeslot or subframe, each of the four second-format uplink control channels occupies one symbol of the first timeslot or subframe, and the seven symbols are completely different from or partially the same as the one symbol in the first timeslot or subframe; or the at least one first-format uplink control channel is specifically one first-format uplink control channel, the at least one second-format uplink control channel is specifically five second-format uplink control channels, the first-format uplink control channel occupies seven symbols of the first timeslot or subframe, each of the five second-format uplink control channels occupies one symbol of the first timeslot or subframe, and the seven symbols are completely different from or partially the same as the one symbol in the first timeslot or subframe.

In a feasible design, the at least one first-format uplink control channel is specifically one first-format uplink control channel, the at least one second-format uplink control channel is specifically one second-format uplink control channel, the at least one third-format uplink control channel is specifically one third-format uplink control channel, the first-format uplink control channel occupies seven symbols of the first timeslot or subframe, the second-format uplink control channel occupies four symbols of the first timeslot or subframe, the third-format uplink control channel occupies one symbol of the first timeslot or subframe, and the seven symbols, the four symbols, and the one symbol are completely different or partially the same in the first timeslot or subframe.

According to a third aspect, an embodiment of this application provides an uplink control channel transmission apparatus, including a processor, a memory, a communications interface, and a system bus, where the memory and the communications interface are connected to the processor by using the system bus, to complete communication with each other; the memory is configured to store a computer executable instruction; the communications interface is configured to communicate with another device; and the processor is configured to run the computer executable instruction, so that the uplink control channel transmission apparatus performs all steps of the method applied to the uplink control channel transmission apparatus.

According to a fourth aspect, an embodiment of this application provides an uplink control channel transmission apparatus, including a processor, a memory, a communications interface, and a system bus, where the memory and the communications interface are connected to the processor by using the system bus, to complete communication with each other; the memory is configured to store a computer executable instruction; the communications interface is configured to communicate with another device; and the processor is configured to run the computer executable instruction, so that the uplink control channel transmission apparatus performs all steps of the method applied to the uplink control channel transmission apparatus.

According to a fifth aspect, an embodiment of this application provides a computer storage medium, configured to store a computer software instruction used by the foregoing uplink control channel transmission apparatus, where the computer software instruction includes a program designed for executing the first aspect or the feasible implementations of the first aspect.

According to a sixth aspect, an embodiment of this application provides a chip system, including at least one processor, a memory, an input/output part, and a bus, where the at least one processor obtains an instruction from the memory by using the bus, to implement a design function of the uplink control channel transmission apparatus used in the foregoing method.

According to a seventh aspect, an embodiment of this application provides an uplink control channel transmission apparatus, including a memory and a processor, where the memory is configured to store a program instruction, and the processor is configured to call the program instruction in the memory, to implement a function of the uplink control channel transmission apparatus in the foregoing method embodiments.

According to the uplink control channel transmission method and apparatus provided in the embodiments of this application, the at least one first-format uplink control channel and the at least one second-format uplink control channel are added to the first timeslot or subframe, and then the first timeslot or subframe including the at least one first-format uplink control channel and the at least one second-format uplink control channel is transmitted. In the process, there are only two formats of uplink control channels, so that uplink scheduling complexity is reduced.

DESCRIPTION OF EMBODIMENTS

Figure 1A:
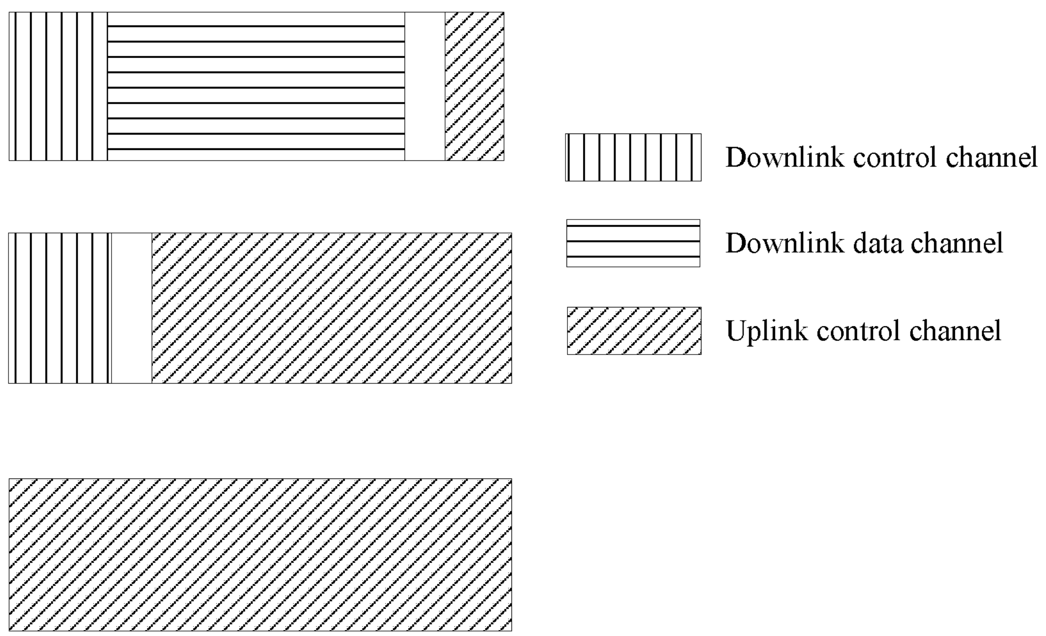
FIG. 1A is a schematic structural diagram of a subframe used to carry an uplink control channel in future 5G.

FIG. 1A is a schematic structural diagram of a subframe used to carry an uplink control channel in future 5G. FIG. 1A shows a DL domain timeslot or subframe, a UL domain timeslot or subframe, and a UL only timeslot or subframe sequentially from top to bottom. A part filled with vertical lines represents a resource used to transmit a downlink control channel; a part filled with horizontal lines represents a resource used to transmit a downlink data channel; an unfilled part represents a gap, which usually occupies one symbol; and a part filled with slashes represents an uplink transmission resource. It can be learned from FIG. 1A that last one or two symbols of the DL domain timeslot or subframe is/are an uplink transmission resource, and is/are mainly used to transmit a short duration UL control channel; first two or three symbols of the UL domain timeslot or subframe are a downlink transmission resource and a gap (Gap), and remaining symbols are an uplink transmission resource; and all symbols of the UL only timeslot or subframe are an uplink transmission resource.

The UL domain timeslot or subframe can be used to transmit a short duration UL control channel and a long duration UL control channel. Therefore, an uplink control channel is carried by using the UL domain timeslot or subframe, and a quantity of symbols of the uplink control channel is variable. Consequently, the UL domain timeslot or subframe may include a plurality of formats of uplink control channels. Likewise, the UL only timeslot or subframe may also include a plurality of formats of uplink control channels.

Further, in 5G subframes of a same type may include different quantities of symbols. For example, the UL domain timeslot or subframe may be a UL domain timeslot or subframe including seven symbols or a UL domain timeslot or subframe including 14 symbols. Therefore, based on the quantities of symbols included in the UL domain timeslot or subframe, the UL domain timeslot or subframe may include a relatively large quantity of formats of uplink control channels. Likewise, based on quantities of symbols included in the UL only timeslot or subframe, the UL only timeslot or subframe may include a relatively large quantity of formats of uplink control channels. Specifically, FIG. 1B is a schematic diagram of an uplink transmission resource in a UL domain timeslot or subframe and a UL only timeslot or subframe.

Figure 1B:
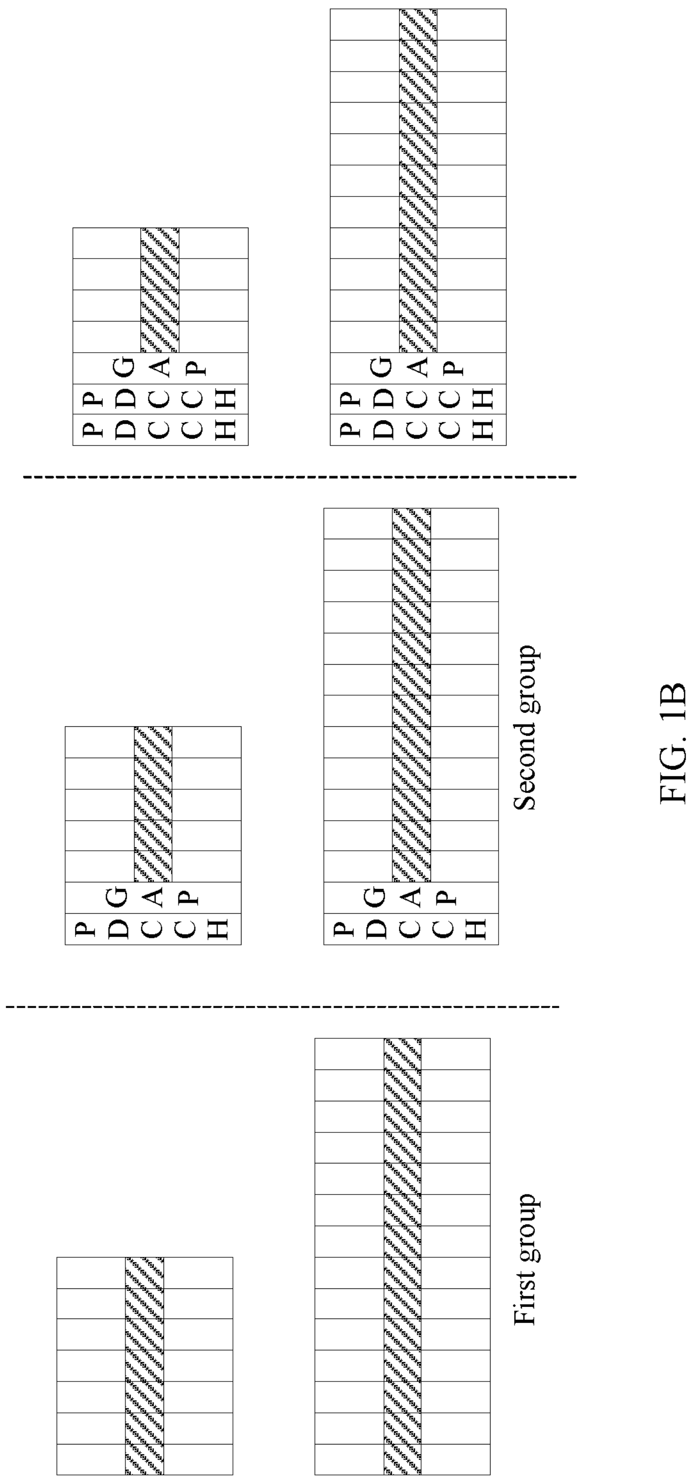
FIG. 1B is a schematic diagram of an uplink transmission resource in a UL domain timeslot or subframe and a UL only timeslot or subframe.

Referring to FIG. 1B, a first group includes UL only timeslots or subframes, a second group includes UL domain timeslots or subframes, and a third group also includes UL domain timeslots or subframes. In each subframe group, an upper part is a subframe including seven symbols, and a lower part is a subframe including 14 symbols. All symbols in the first group are an uplink transmission resource. First two symbols in the second group are symbols respectively occupied by a physical downlink control channel (Physical Downlink Control Channel, PDCCH) and a gap, and symbols following the first two symbols are an uplink transmission resource. First two symbols in the third group are symbols occupied by PDCCHs, a third symbol is a symbol occupied by a gap, and remaining symbols are an uplink transmission resource. The uplink transmission resource is marked by using parts filled with slashes in the figure.

The second group is used as an example. When a UL domain timeslot or subframe is a subframe including seven symbols, a short duration UL control channel may occupy symbols of different quantities or at different locations, and a long duration UL control channel may occupy symbols of different quantities or at different locations. Therefore, a system includes various formats of uplink control channels. When a UL domain timeslot or subframe is a subframe including 14 symbols, a short duration UL control channel may occupy symbols of different quantities or at different locations, and a long duration UL control channel may occupy symbols of different quantities or at different locations. Therefore, the system also includes various formats of uplink control channels.

It can be learned from the foregoing that if uplink control channels are carried by using different types of subframes, there are a plurality of formats of uplink control channels. This increases complexity of scheduling an uplink control channel.

Figure 2:
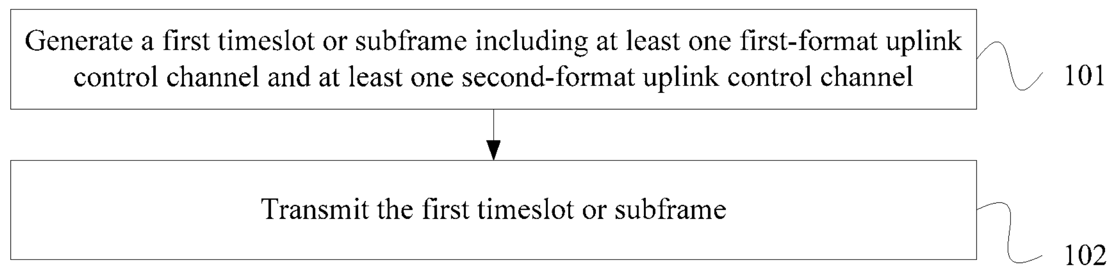
FIG. 2 is a flowchart of Embodiment 1 of an uplink control channel transmission method according to this application.

FIG. 2 is a flowchart of Embodiment 1 of an uplink control channel transmission method according to this application. The method includes the following steps.

101. Generate a first timeslot or subframe including at least one first-format uplink control channel and at least one second-format uplink control channel.

This embodiment of this application is executed by a transmission apparatus. The transmission apparatus may be integrated on a terminal, and is configured to: in uplink control channel transmission, generate uplink control channels in various formats and transmit the uplink control channels to a network side device.

In this embodiment of this application, the first timeslot and the first subframe are used to describe a same time domain resource, and are two different names of the same time domain resource. It should be understood that, in the embodiments of this application, the first timeslot and subframe may represent a UL domain timeslot or subframe or a UL only timeslot or subframe. This is not specifically limited.

In the step, the transmission apparatus adds the first-format uplink control channel and the second-format uplink control channel to the first timeslot or subframe, and there are one or more first-format uplink control channels and one or more second-format uplink control channels. The first-format uplink control channel occupies N symbols, and the second-format uplink control channel occupies M symbols, where N≥M. For example, when the first-format uplink control channel is a long duration UL control channel and the second-format uplink control channel is a short duration UL control channel, N>M. For another example, when the first-format uplink control channel is a long duration UL control channel, and the second-format uplink control channel is also a long duration UL control channel, N≥M.

It should be noted that in this embodiment of the present invention, formats of uplink control channels are differentiated by using quantities of occupied symbols. In other words, uplink control channels in different formats may occupy different quantities of symbols.

102. Transmit the first timeslot or subframe.

The transmission apparatus transmits, to the network side device, the first timeslot or subframe including the at least one first-format uplink control channel and the at least one second-format uplink control channel.

According to the uplink control channel transmission method provided in this embodiment of this application, the at least one first-format uplink control channel and the at least one second-format uplink control channel are added to the first timeslot or subframe, and then the first timeslot or subframe including the at least one first-format uplink control channel and the at least one second-format uplink control channel is transmitted. In the process, there are only two formats of uplink control channels, so that uplink scheduling complexity is reduced.

Optionally, from a perspective of a time domain resource, in an embodiment of this application, a symbol occupied by at least one of the at least one first-format uplink control channel is completely different from or partially the same as a symbol occupied by at least one of the at least one second-format uplink control channel.

In the method, flexible configuration of a time domain resource occupied by uplink control channels in two different formats is implemented.

Optionally, from a perspective of a frequency domain resource, in an embodiment of this application, at least one of the at least one first-format uplink control channel occupies a first frequency resource, at least one of the at least one second-format uplink control channel occupies a second frequency resource, and the first frequency resource is completely different from or partially the same as the second frequency resource.

Specifically, in frequency domain, the first-format uplink control channel occupies the first frequency resource, and the second-format uplink control channel occupies the second frequency resource. The first frequency resource may be completely different from the second frequency resource, the first frequency resource and the second frequency resource may be a same frequency resource, or there is a same part between the first frequency resource and the second frequency resource.

Further, optionally, the first frequency resource occupies two ends of a system frequency band, and the second frequency occupies all or a part of the system frequency band, or the second frequency occupies a part of the system frequency band except the first frequency resource.

In the method, flexible configuration of a frequency resource occupied by uplink control channels in two different formats is implemented.

Optionally, for the transmission apparatus, in addition to the first-format uplink control channel and the second-format uplink control channel, the first timeslot or subframe may further include at least one third-format uplink control channel, and then the at least one third-format uplink control channel is transmitted. A symbol occupied by at least one of the at least one third-format uplink control channel is completely different from or partially the same as the symbol occupied by the at least one of the at least one first-format uplink control channel, or a symbol occupied by at least one of the at least one third-format uplink control channel is completely different from or partially the same as the symbol occupied by the at least one of the at least one second-format uplink control channel.

Specifically, the first-format uplink control channel, the second-format uplink control channel, and the third-format uplink control channel respectively occupy different time domain resources, or a time domain resource occupied by the third-format uplink control channel overlaps partially a time domain resource occupied by the first-format uplink control channel, or a time domain resource occupied by the third-format uplink control channel overlaps partially a time domain resource occupied by the second-format uplink control channel.

In the method, there are only three formats of uplink control channels, so that uplink scheduling complexity is reduced, and flexible configuration of a time domain resource occupied by the uplink control channels in the three different formats is implemented.

Further, optionally, the at least one of the at least one first-format uplink control channel occupies the first frequency resource, the at least one of the at least one second-format uplink control channel occupies the second frequency resource, the at least one third-format uplink control channel of the at least one third-format uplink control channel format occupies a third frequency resource. The first frequency resource is completely different from or partially the same as the second frequency resource; and the third frequency resource is completely different from or partially the same as the first frequency resource, or the third frequency resource is completely different from or partially the same as the second frequency resource. For example, the third frequency occupies all or a part of the system frequency band, or the third frequency occupies a part of the system frequency band except the first frequency resource and the second frequency resource.

Optionally, the first-format uplink control channel, the second-format uplink control channel, or the third-format uplink control channel occupies at least two parts of frequency resources, and at least two of the at least two parts of frequency resources are different.

Specifically, when the first-format uplink control channel, the second-format uplink control channel, or the third-format uplink control channel occupies two parts of frequency resources, the two parts of frequency resources are different frequency resources. For example, one of the two parts of frequency resources occupies one end of the system frequency band, and the other of the two parts occupies the other end of the system frequency band, so that frequency diversity gains are implemented.

The following uses an example in which one first-format uplink control channel and one second-format uplink control channel are added to the first timeslot or subframe, to describe in detail the uplink control channel transmission method.

Figure 3A:
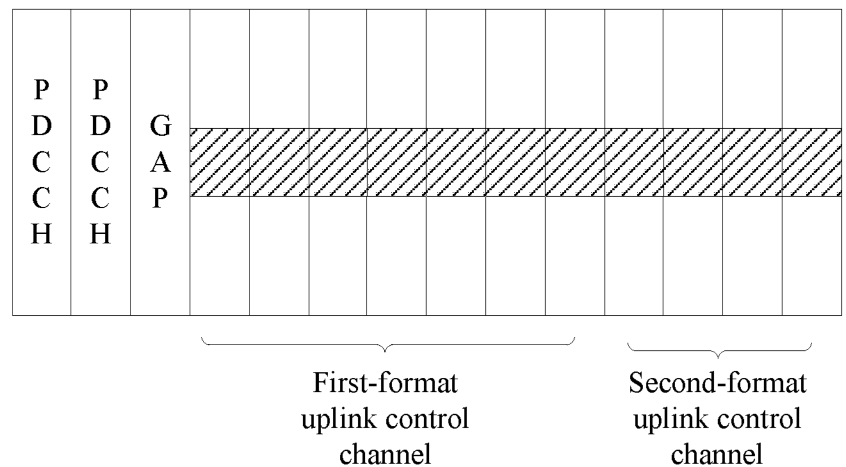
FIG. 3A is a schematic diagram of a first-format uplink control channel and a second-format uplink control channel in Embodiment 2 of an uplink control channel transmission method according to this application.
Figure 3B:
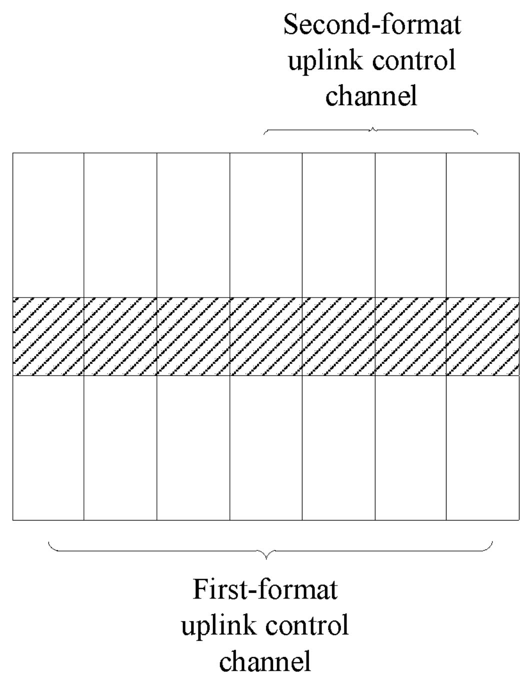
FIG. 3B is another schematic diagram of a first-format uplink control channel and a second-format uplink control channel in Embodiment 2 of an uplink control channel transmission method according to this application.

For example, the first-format uplink control channel occupies seven symbols of the first timeslot or subframe, the second-format uplink control channel occupies four symbols of the first timeslot or subframe, and the seven symbols are completely different from or partially the same as the four symbols in the first timeslot or subframe. For details, refer to FIG. 3A and FIG. 3B. FIG. 3A is a schematic diagram of a first-format uplink control channel and a second-format uplink control channel in Embodiment 2 of an uplink control channel transmission method according to this application. FIG. 3B is another schematic diagram of a first-format uplink control channel and a second-format uplink control channel in Embodiment 2 of an uplink control channel transmission method according to this application.

Referring to FIG. 3A, the first timeslot or subframe is a UL domain timeslot or subframe including 14 symbols. First three symbols of the first timeslot or subframe are a downlink transmission resource and a gap (Gap), and remaining 11 symbols are an uplink transmission resource. The first timeslot or subframe includes one first-format uplink control channel and one second-format uplink control channel. The first-format uplink control channel occupies seven symbols following the gap, and the second-format uplink control channel occupies remaining four symbols. In this case, the symbols occupied by the first-format uplink control channel are completely different from the symbols occupied by the second-format uplink control channel.

Referring to FIG. 3B, the first timeslot or subframe is a UL only timeslot or subframe including seven symbols, and the seven symbols are an uplink transmission resource. The first timeslot or subframe includes one first-format uplink control channel occupying seven symbols following a gap, and the second-format uplink control channel occupies four symbols. The four symbols are four of the seven symbols occupied by the first-format uplink control channel. In this case, the symbols occupied by the first-format uplink control channel are partially the same as the symbols occupied by the second-format uplink control channel.

Figure 4A:
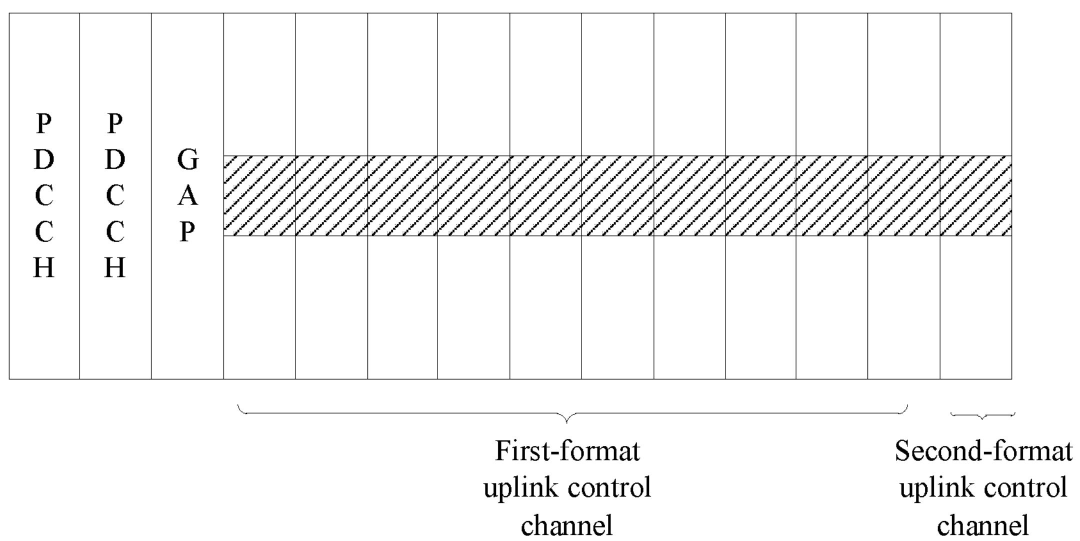
FIG. 4A is a schematic diagram of a first-format uplink control channel and a second-format uplink control channel in Embodiment 3 of an uplink control channel transmission method according to this application.
Figure 4B:
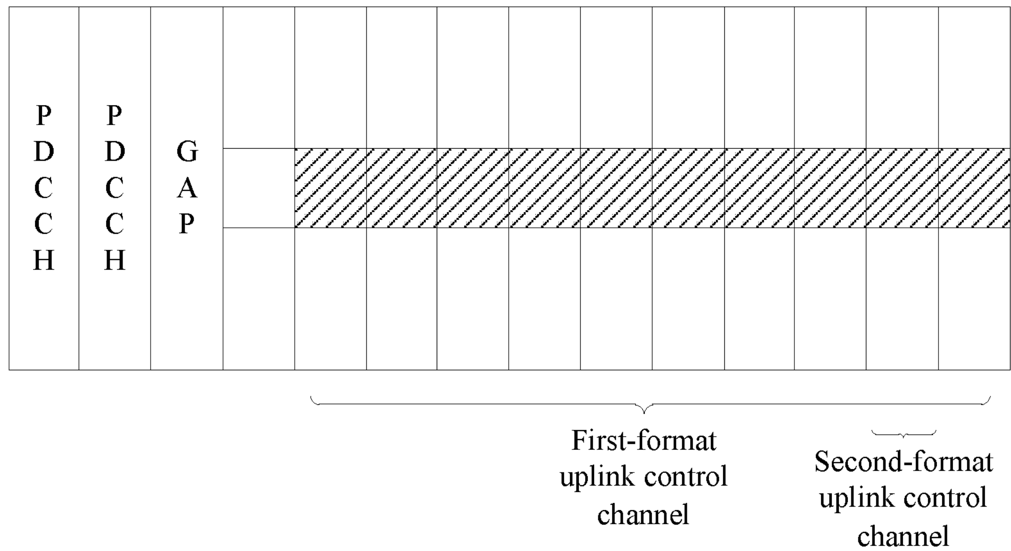
FIG. 4B is another schematic diagram of a first-format uplink control channel and a second-format uplink control channel in Embodiment 3 of an uplink control channel transmission method according to this application.

For another example, the first-format uplink control channel occupies 10 symbols of the first timeslot or subframe, the second-format uplink control channel occupies one symbol of the first timeslot or subframe, and the 10 symbols are completely different from or partially the same as the one symbol in the first timeslot or subframe. For details, refer to FIG. 4A and FIG. 4B. FIG. 4A is a schematic diagram of a first-format uplink control channel and a second-format uplink control channel in Embodiment 3 of an uplink control channel transmission method according to this application. FIG. 4B is another schematic diagram of a first-format uplink control channel and a second-format uplink control channel in Embodiment 3 of an uplink control channel transmission method according to this application.

Referring to FIG. 4A, the first timeslot or subframe is a UL domain timeslot or subframe including 14 symbols. First three symbols of the first timeslot are a downlink transmission resource and a gap (Gap), and remaining 11 symbols are an uplink transmission resource. The first timeslot or subframe includes one first-format uplink control channel and one second-format uplink control channel. The first-format uplink control channel occupies 10 symbols following the gap, and the second-format uplink control channel occupies remaining one symbol. In this case, the symbols occupied by the first-format uplink control channel are completely different from the symbol occupied by the second-format uplink control channel.

Referring to FIG. 4B, a first symbol following a gap is used for a data channel, the first-format uplink control channel occupies 10 symbols starting with a second symbol following the gap, the second-format uplink control channel occupies one symbol, and the one symbol is any one of the 10 symbols occupied by the first-format uplink control channel. In this case, the symbols occupied by the first-format uplink control channel are partially the same as the symbol occupied by the second-format uplink control channel.

Figure 5A:
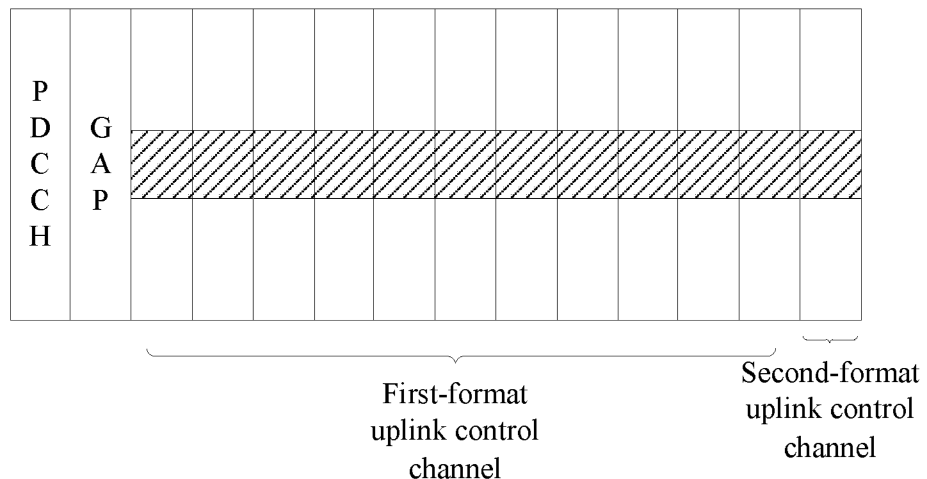
FIG. 5A is a schematic diagram of a first-format uplink control channel and a second-format uplink control channel in Embodiment 4 of an uplink control channel transmission method according to this application.
Figure 5B:
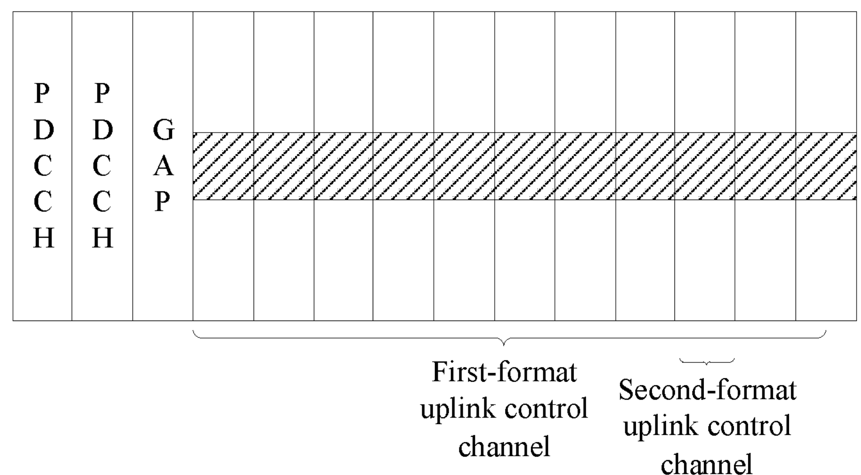
FIG. 5B is another schematic diagram of a first-format uplink control channel and a second-format uplink control channel in Embodiment 4 of an uplink control channel transmission method according to this application.

For another example, the first-format uplink control channel occupies 11 symbols of the first timeslot or subframe, the second-format uplink control channel occupies one symbol of the first timeslot or subframe, and the 11 symbols are completely different from or partially the same as the one symbol in the first timeslot or subframe. For details, refer to FIG. 5A and FIG. 5B. FIG. 5A is a schematic diagram of a first-format uplink control channel and a second-format uplink control channel in Embodiment 4 of an uplink control channel transmission method according to this application. FIG. 5B is another schematic diagram of a first-format uplink control channel and a second-format uplink control channel in Embodiment 4 of an uplink control channel transmission method according to this application.

Referring to FIG. 5A, the first timeslot or subframe is a UL domain timeslot or subframe including 14 symbols. First two symbols of the first timeslot or subframe are a downlink transmission resource and a gap (Gap), and remaining 12 symbols are an uplink transmission resource. The first timeslot or subframe includes one first-format uplink control channel and one second-format uplink control channel. The first-format uplink control channel occupies 11 symbols following the gap, and the second-format uplink control channel occupies remaining one symbol. In this case, the symbols occupied by the first-format uplink control channel are completely different from the symbol occupied by the second-format uplink control channel.

Referring to FIG. 5B, the first timeslot or subframe is a UL domain timeslot or subframe including 14 symbols. First three symbols of the first timeslot or subframe are a downlink transmission resource and a gap (Gap), and remaining 11 symbols are an uplink transmission resource. The first-format uplink control channel occupies 11 symbols following the gap, and the second-format uplink control channel occupies one symbol. The one symbol is any one of the 11 symbols occupied by the first-format uplink control channel. In this case, the symbols occupied by the first-format uplink control channel are partially the same as the symbol occupied by the second-format uplink control channel.

Figure 6A:
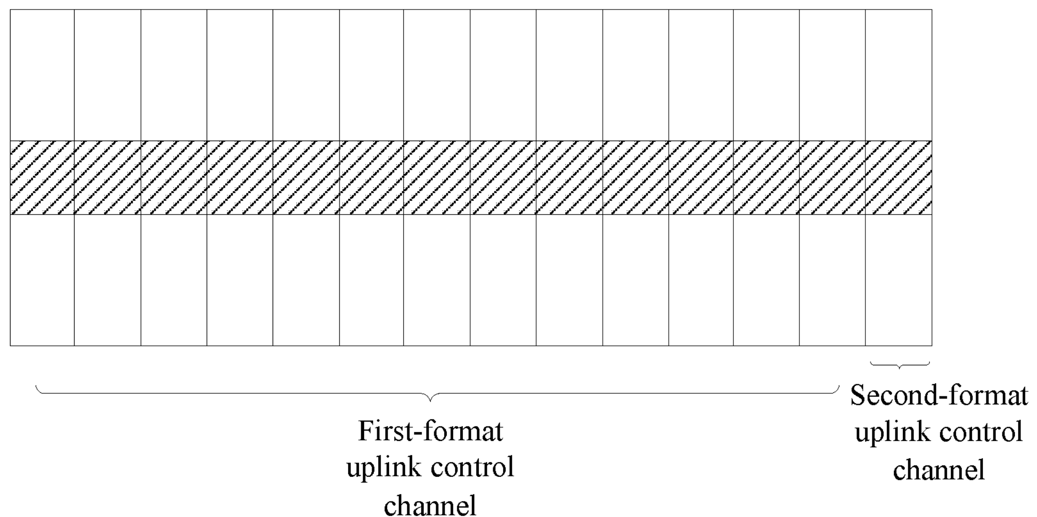
FIG. 6A is a schematic diagram of a first-format uplink control channel and a second-format uplink control channel in Embodiment 5 of an uplink control channel transmission method according to this application.
Figure 6B:
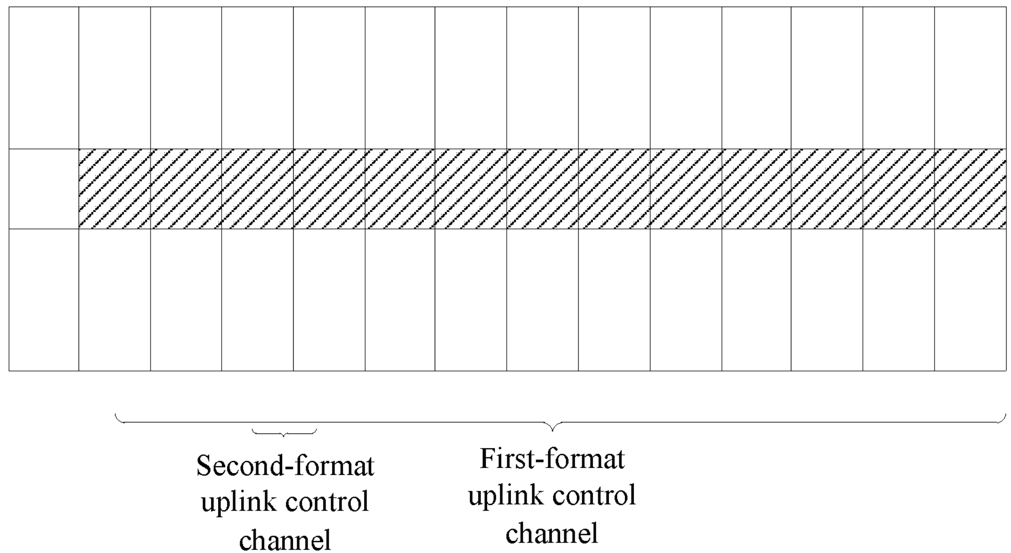
FIG. 6B is another schematic diagram of a first-format uplink control channel and a second-format uplink control channel in Embodiment 5 of an uplink control channel transmission method according to this application.

For another example, the first-format uplink control channel occupies 13 symbols of the first timeslot or subframe, the second-format uplink control channel occupies one symbol of the first timeslot or subframe, and the 13 symbols are completely different from or partially the same as the one symbol in the first timeslot or subframe. For details, refer to FIG. 6A and FIG. 6B. FIG. 6A is a schematic diagram of a first-format uplink control channel and a second-format uplink control channel in Embodiment 5 of an uplink control channel transmission method according to this application. FIG. 6B is another schematic diagram of a first-format uplink control channel and a second-format uplink control channel in Embodiment 5 of an uplink control channel transmission method according to this application.

Referring to FIG. 6A, the first timeslot or subframe is a UL only timeslot or subframe including 14 symbols, and the 14 symbols are an uplink transmission resource. The first timeslot or subframe includes one first-format uplink control channel and one second-format uplink control channel. The first-format uplink control channel occupies 13 symbols, and the second-format uplink control channel occupies remaining one symbol. In this case, the symbols occupied by the first-format uplink control channel are completely different from the symbol occupied by the second-format uplink control channel.

Referring to FIG. 6B, a first symbol is used for a data channel, the first-format uplink control channel occupies remaining 13 symbols, the second-format uplink control channel occupies one symbol, and the one symbol is any one of the 13 symbols occupied by the first-format uplink control channel. In this case, the symbols occupied by the first-format uplink control channel are partially the same as the symbol occupied by the second-format uplink control channel.

Figure 7A:
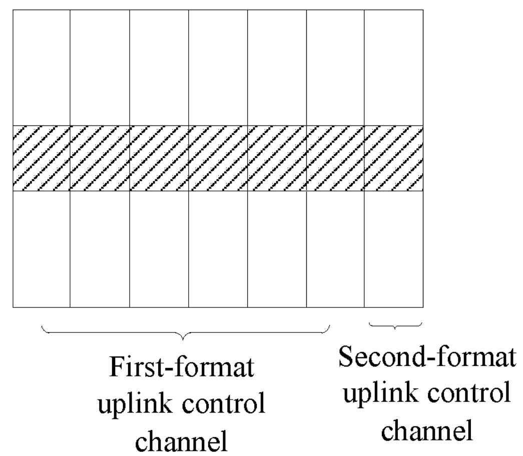
FIG. 7A is a schematic diagram of a first-format uplink control channel and a second-format uplink control channel in Embodiment 6 of an uplink control channel transmission method according to this application.
Figure 7B:
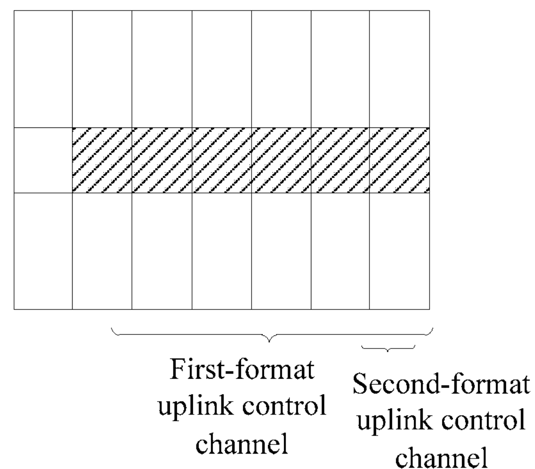
FIG. 7B is another schematic diagram of a first-format uplink control channel and a second-format uplink control channel in Embodiment 6 of an uplink control channel transmission method according to this application.

For another example, the first-format uplink control channel occupies six symbols of the first timeslot or subframe, the second-format uplink control channel occupies one symbol of the first timeslot or subframe, and the six symbols are completely different from or partially the same as the one symbol in the first timeslot or subframe. For details, refer to FIG. 7A and FIG. 7B. FIG. 7A is a schematic diagram of a first-format uplink control channel and a second-format uplink control channel in Embodiment 6 of an uplink control channel transmission method according to this application. FIG. 7B is another schematic diagram of a first-format uplink control channel and a second-format uplink control channel in Embodiment 6 of an uplink control channel transmission method according to this application.

Referring to FIG. 7A, the first timeslot or subframe is a UL only timeslot or subframe including seven symbols, and the seven symbols are an uplink transmission resource. The first timeslot or subframe includes one first-format uplink control channel and one second-format uplink control channel. The first-format uplink control channel occupies six symbols, and the second-format uplink control channel occupies remaining one symbol. In this case, the symbols occupied by the first-format uplink control channel are completely different from the symbol occupied by the second-format uplink control channel.

Referring to FIG. 7B, a first symbol is used for a data channel, the first-format uplink control channel occupies remaining six symbols, the second-format uplink control channel occupies one symbol, and the one symbol is any one of the six symbols occupied by the first-format uplink control channel. In this case, the symbols occupied by the first-format uplink control channel are partially the same as the symbol occupied by the second-format uplink control channel.

Figure 8A:
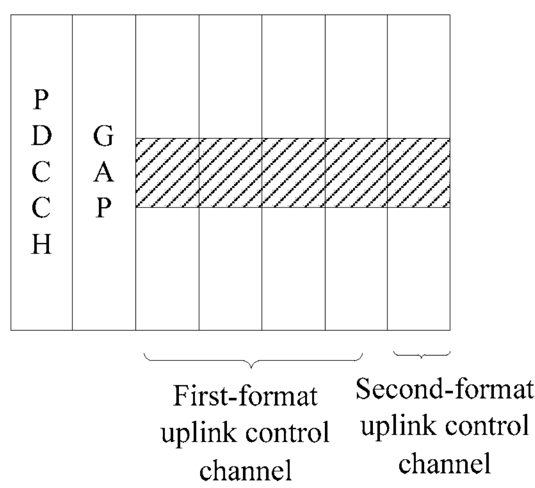
FIG. 8A is a schematic diagram of a first-format uplink control channel and a second-format uplink control channel in Embodiment 7 of an uplink control channel transmission method according to this application.
Figure 8B:
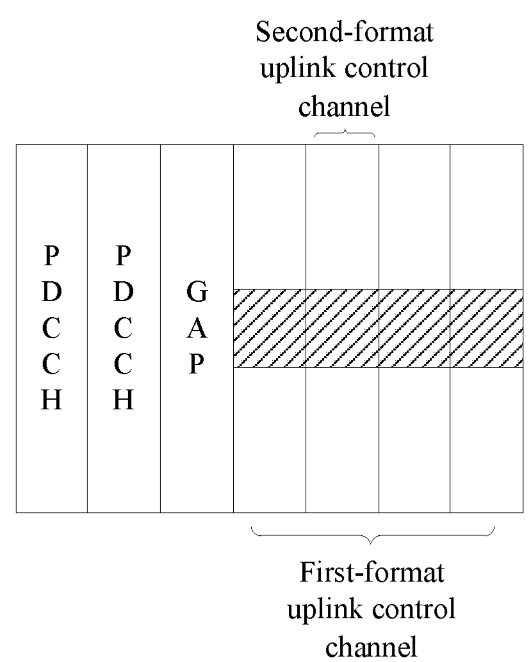
FIG. 8B is another schematic diagram of a first-format uplink control channel and a second-format uplink control channel in Embodiment 7 of an uplink control channel transmission method according to this application.

For another example, the first-format uplink control channel occupies four symbols of the first timeslot or subframe, the second-format uplink control channel occupies one symbol of the first timeslot or subframe, and the four symbols are completely different from or partially the same as the one symbol in the first timeslot or subframe. For details, refer to FIG. 8A and FIG. 8B. FIG. 8A is a schematic diagram of a first-format uplink control channel and a second-format uplink control channel in Embodiment 7 of an uplink control channel transmission method according to this application. FIG. 8B is another schematic diagram of a first-format uplink control channel and a second-format uplink control channel in Embodiment 7 of an uplink control channel transmission method according to this application.

Referring to FIG. 8A, the first timeslot or subframe is a UL domain timeslot or subframe including seven symbols. First two symbols of the first timeslot are a downlink transmission resource and a gap (Gap), and remaining five symbols are an uplink transmission resource. The first timeslot or subframe includes one first-format uplink control channel and one second-format uplink control channel. The first-format uplink control channel occupies four symbols following the gap, and the second-format uplink control channel occupies remaining one symbol. In this case, the symbols occupied by the first-format uplink control channel are completely different from the symbol occupied by the second-format uplink control channel.

Referring to FIG. 8B, the first timeslot or subframe is a UL domain timeslot or subframe including seven symbols. First three symbols of the first timeslot or subframe are a downlink transmission resource and a gap (Gap), and remaining four symbols are an uplink transmission resource. The first-format uplink control channel occupies four symbols following the gap, the second-format uplink control channel occupies one symbol, and the one symbol is any one of the four symbols occupied by the first-format uplink control channel. In this case, the symbols occupied by the first-format uplink control channel are partially the same as the symbol occupied by the second-format uplink control channel.

Figure 9A:
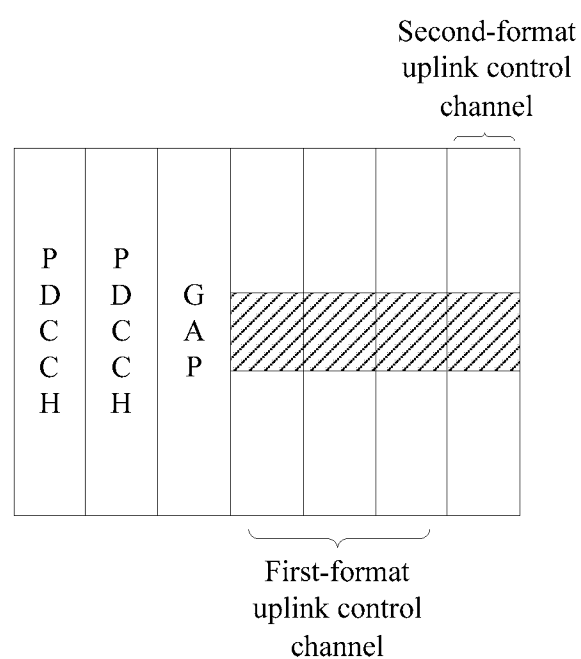
FIG. 9A is a schematic diagram of a first-format uplink control channel and a second-format uplink control channel in Embodiment 8 of an uplink control channel transmission method according to this application.
Figure 9B:
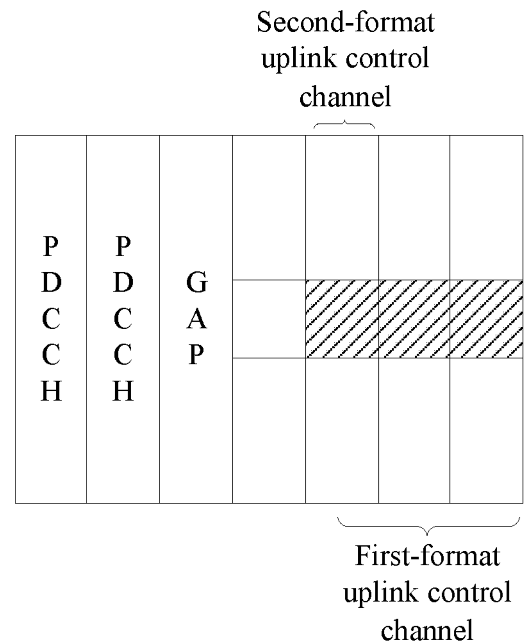
FIG. 9B is another schematic diagram of a first-format uplink control channel and a second-format uplink control channel in Embodiment 8 of an uplink control channel transmission method according to this application.

For another example, the first-format uplink control channel occupies three symbols of the first timeslot or subframe, the second-format uplink control channel occupies one symbol of the first timeslot or subframe, and the three symbols are completely different from or partially the same as the one symbol in the first timeslot or subframe. For details, refer to FIG. 9A and FIG. 9B. FIG. 9A is a schematic diagram of a first-format uplink control channel and a second-format uplink control channel in Embodiment 8 of an uplink control channel transmission method according to this application. FIG. 9B is another schematic diagram of a first-format uplink control channel and a second-format uplink control channel in Embodiment 8 of an uplink control channel transmission method according to this application.

Referring to FIG. 9A, the first timeslot or subframe is a UL domain timeslot or subframe including seven symbols. First three symbols of the first timeslot or subframe are a downlink transmission resource and a gap (Gap), and remaining four symbols are an uplink transmission resource. The first timeslot or subframe includes one first-format uplink control channel and one second-format uplink control channel. The first-format uplink control channel occupies three symbols following the gap, and the second-format uplink control channel occupies remaining one symbol. In this case, the symbols occupied by the first-format uplink control channel are completely different from the symbol occupied by the second-format uplink control channel.

Referring to FIG. 9B, a first symbol following a gap is used for a data channel, the first-format uplink control channel occupies remaining three symbols following the gap, the second-format uplink control channel occupies one symbol, and the one symbol is any one of the three symbols occupied by the first-format uplink control channel. In this case, the symbols occupied by the first-format uplink control channel are partially the same as the symbol occupied by the second-format uplink control channel.

In the method, flexible configuration of a time domain resource occupied by uplink control channels in two different formats is implemented.

The following uses an example in which one first-format uplink control channel and a plurality of second-format uplink control channels are added to a first timeslot or subframe, to describe in detail the uplink control channel transmission method.

Figure 10A:
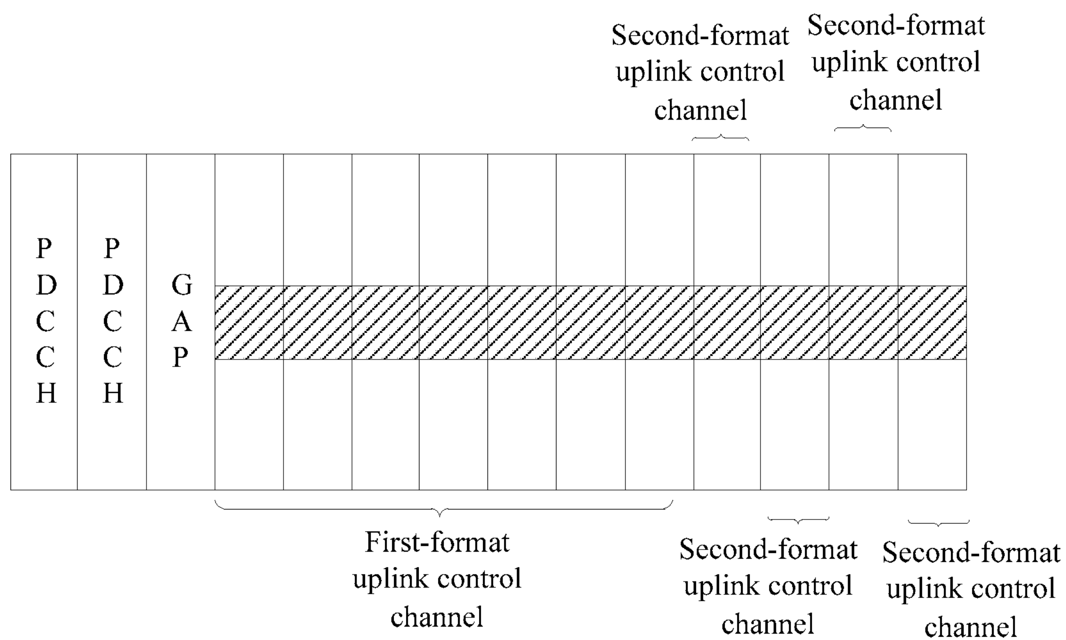
FIG. 10A is a schematic diagram of a first-format uplink control channel and a second-format uplink control channel in Embodiment 9 of an uplink control channel transmission method according to this application.
Figure 10B:
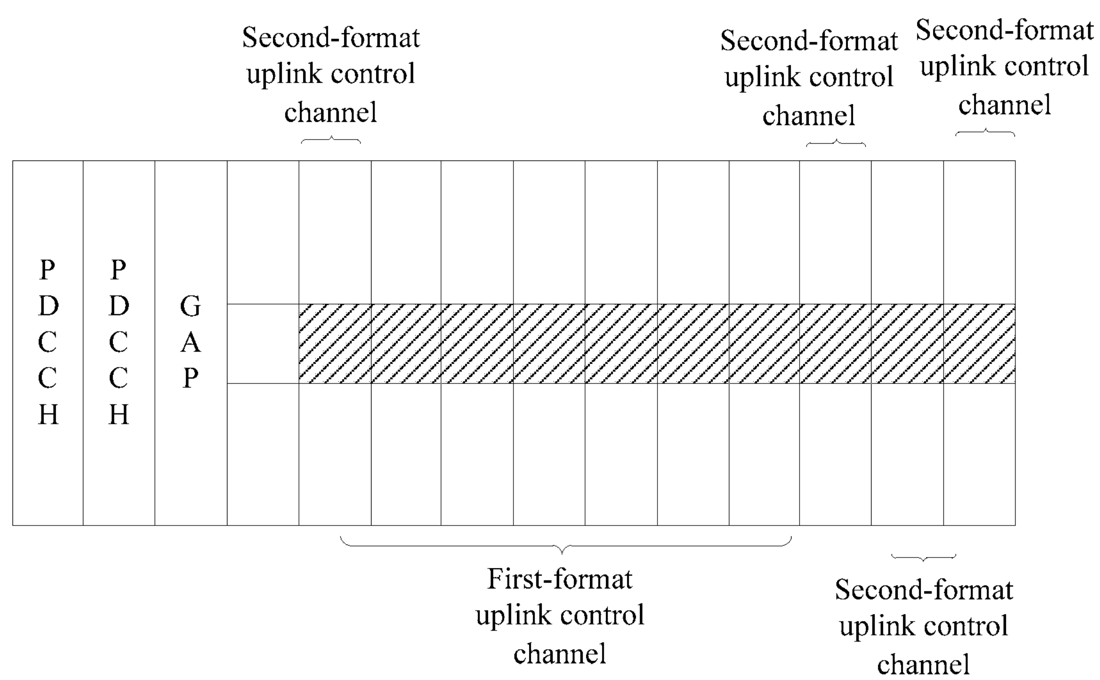
FIG. 10B is another schematic diagram of a first-format uplink control channel and a second-format uplink control channel in Embodiment 9 of an uplink control channel transmission method according to this application.

For example, the at least one first-format uplink control channel is specifically one first-format uplink control channel, the at least one second-format uplink control channel is specifically four second-format uplink control channels, the first-format uplink control channel occupies seven symbols of the first timeslot or subframe, each of the four second-format uplink control channels occupies one symbol of the first timeslot or subframe, and the seven symbols are completely different from or partially the same as the one symbol in the first timeslot or subframe. For details, refer to FIG. 10A and FIG. 10B. FIG. 10A is a schematic diagram of a first-format uplink control channel and a second-format uplink control channel in Embodiment 9 of an uplink control channel transmission method according to this application. FIG. 10B is another schematic diagram of a first-format uplink control channel and a second-format uplink control channel in Embodiment 9 of an uplink control channel transmission method according to this application.

Referring to FIG. 10A, the first timeslot or subframe is a UL domain timeslot or subframe including 14 symbols. First three symbols of the first timeslot are a downlink transmission resource and a gap (Gap), and remaining 11 symbols are an uplink transmission resource. The first timeslot or subframe includes one first-format uplink control channel and four second-format uplink control channels. The first-format uplink control channel occupies seven symbols following the gap, and the four second-format uplink control channels sequentially occupy remaining four symbols. In this case, the symbols occupied by the first-format uplink control channel are completely different from the symbols occupied by the second-format uplink control channel.

Referring to FIG. 10B, a first symbol following a gap is used for a data channel. The first-format uplink control channel occupies seven symbols following the gap and the data channel, three of the four second-format uplink control channels sequentially occupy remaining three symbols, the other one second-format uplink control channel occupies one symbol, and the one symbol is any one of the seven symbols occupied by the first-format uplink control channel. In this case, the symbols occupied by the first-format uplink control channel are partially the same as the symbols occupied by the second-format uplink control channels.

Figure 11A:
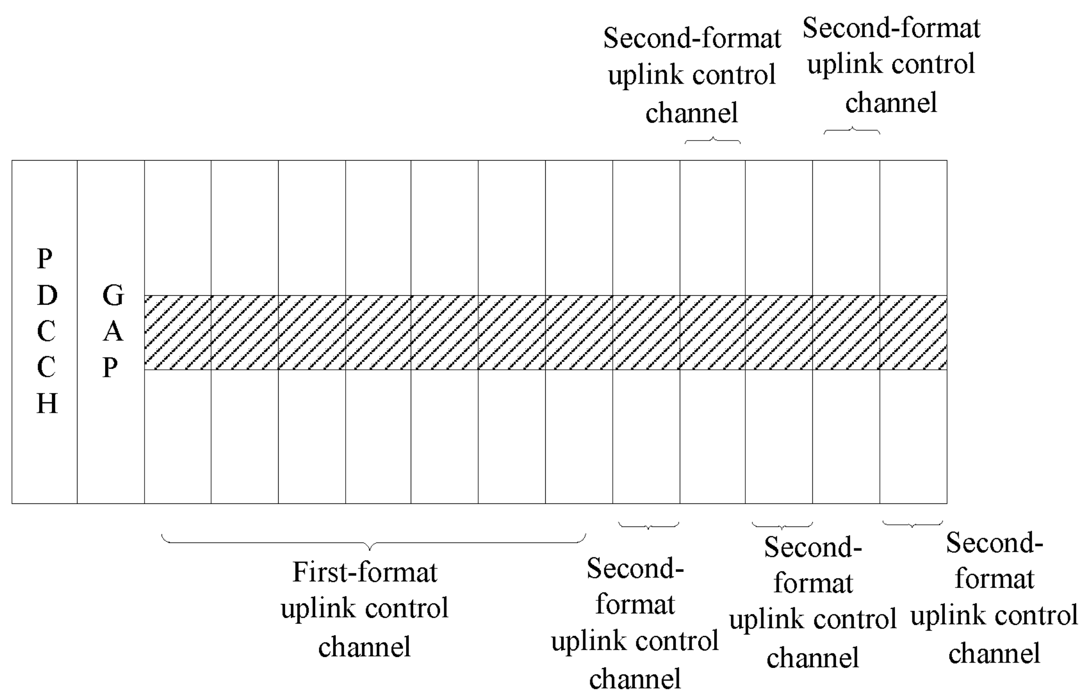
FIG. 11A is a schematic diagram of a first-format uplink control channel and a second-format uplink control channel in Embodiment 10 of an uplink control channel transmission method according to this application.
Figure 11B:
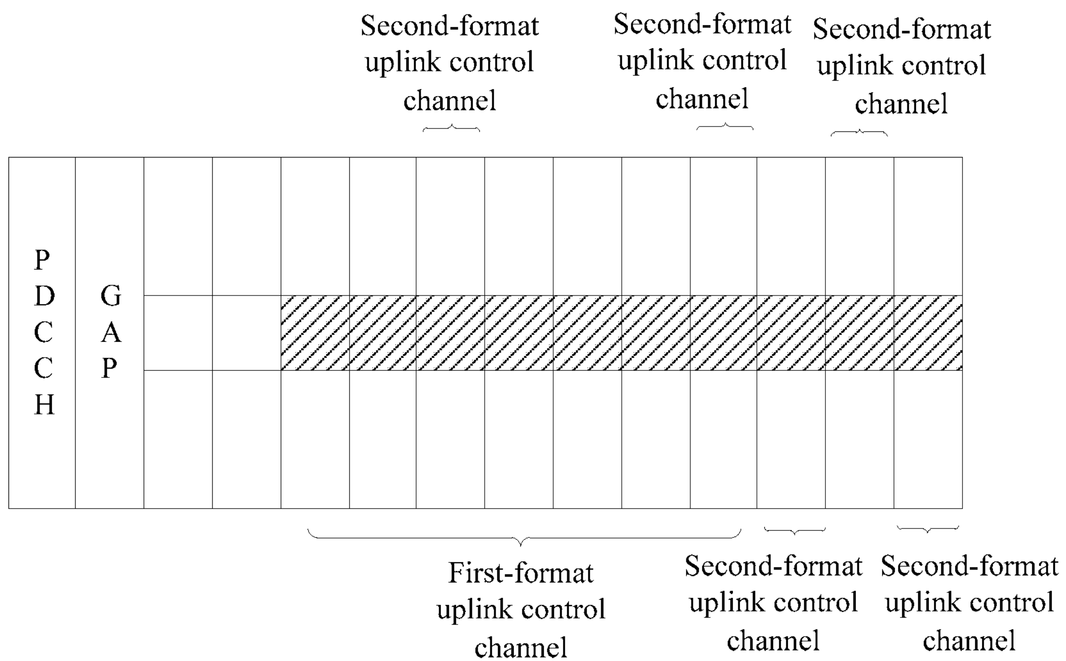
FIG. 11B is another schematic diagram of a first-format uplink control channel and a second-format uplink control channel in Embodiment 10 of an uplink control channel transmission method according to this application.

For another example, the at least one first-format uplink control channel is specifically one first-format uplink control channel, the at least one second-format uplink control channel is specifically five second-format uplink control channels, the first-format uplink control channel occupies seven symbols of the first timeslot or subframe, each of the five second-format uplink control channels occupies one symbol of the first timeslot or subframe, and the seven symbols are completely different from or partially the same as the one symbol in the first timeslot or subframe. For details, refer to FIG. 11A and FIG. 11B. FIG. 11A is a schematic diagram of a first-format uplink control channel and a second-format uplink control channel in Embodiment 10 of an uplink control channel transmission method according to this application. FIG. 11B is another schematic diagram of a first-format uplink control channel and a second-format uplink control channel in Embodiment 10 of an uplink control channel transmission method according to this application.

Referring to FIG. 11A, the first timeslot or subframe is a UL domain timeslot or subframe including 14 symbols. First two symbols of the first timeslot or subframe are a downlink transmission resource and a gap (Gap), and remaining 12 symbols are an uplink transmission resource. The first timeslot or subframe includes one first-format uplink control channel and five second-format uplink control channels. The first-format uplink control channel occupies seven symbols following the gap, and the five second-format uplink control channels sequentially occupy remaining five symbols. In this case, the symbols occupied by the first-format uplink control channel are completely different from the symbols occupied by the second-format uplink control channels.

Referring to FIG. 11B, a first symbol and a second symbol following a gap are used for a data channel. The first-format uplink control channel occupies seven symbols following the data channel, three of the five second-format uplink control channels sequentially occupy remaining three symbols, and one symbol occupied by each of the other two second-format uplink control channels is any one of the seven symbols occupied by the first-format uplink control channel. In this case, the symbols occupied by the first-format uplink control channel are partially the same as the symbols occupied by the second-format uplink control channels.

The following uses an example in which one first-format uplink control channel, one second-format uplink control channel, and one third-format uplink control channel are added to the first timeslot or subframe, to describe in detail the uplink control channel transmission method.

Figure 12A:
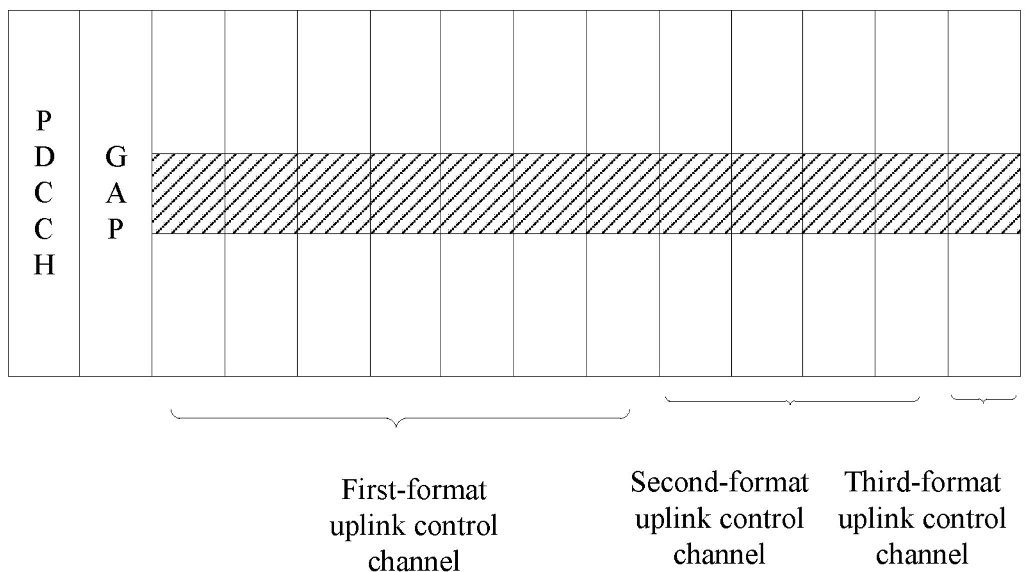
FIG. 12A is a schematic diagram of a first-format uplink control channel, a second-format uplink control channel, and a third-format uplink control channel in Embodiment 11 of an uplink control channel transmission method according to this application.
Figure 12B:
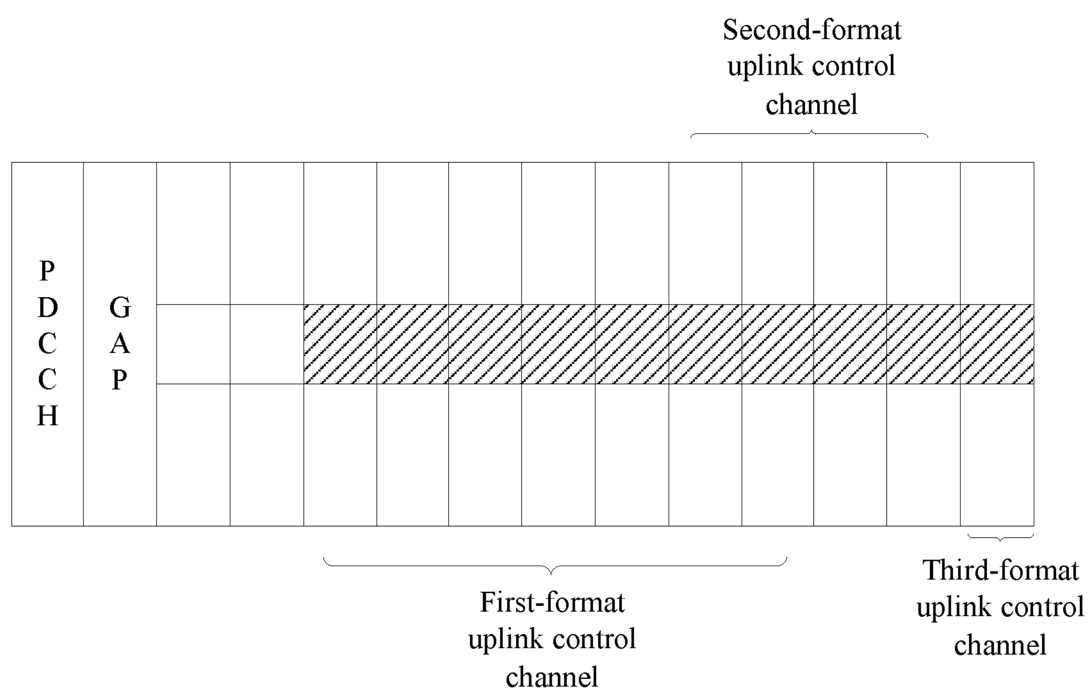
FIG. 12B is another schematic diagram of a first-format uplink control channel, a second-format uplink control channel, and a third-format uplink control channel in Embodiment 11 of an uplink control channel transmission method according to this application.

For example, the first-format uplink control channel occupies seven symbols of the first timeslot or subframe, the second-format uplink control channel occupies four symbols of the first timeslot or subframe, the third-format uplink control channel occupies one symbol of the first timeslot or subframe, and the seven symbols, the four symbols, and the one symbol are completely different or partially the same in the first timeslot or subframe. For details, refer to FIG. 12A and FIG. 12B. FIG. 12A is a schematic diagram of a first-format uplink control channel, a second-format uplink control channel, and a third-format uplink control channel in Embodiment 11 of an uplink control channel transmission method according to this application. FIG. 12B is another schematic diagram of a first-format uplink control channel, a second-format uplink control channel, and a third-format uplink control channel in Embodiment 11 of an uplink control channel transmission method according to this application.

Referring to FIG. 12A, the first timeslot or subframe is a UL domain timeslot or subframe including 14 symbols. First two symbols of the first timeslot are a downlink transmission resource and a gap (Gap), and remaining 12 symbols are an uplink transmission resource. The first timeslot or subframe includes one first-format uplink control channel, one second-format uplink control channel, and one third-format uplink control channel. The first-format uplink control channel occupies seven symbols following the gap, the second-format uplink control channel occupies four of remaining five symbols, and the third-format uplink control channel occupies a last one symbol. In this case, symbols occupied by the first-format uplink control channel, the second-format uplink control channel, and the third-format uplink control channel are completely different.

Referring to FIG. 12B, two symbols following a gap are used for a data channel. The first-format uplink control channel occupies seven symbols following the data channel, the second-format uplink control channel occupies four symbols, where two of the four symbols overlap symbols occupied by the first-format uplink control channel, and the third-format uplink control channel occupies a last symbol. In this case, symbols occupied by the first-format uplink control channel, the second-format uplink control channel, and the third-format uplink control channel are partially the same.

The following uses an example in which the first timeslot or subframe includes seven symbols or 14 symbols, and an uplink control channel occupies one symbol, two symbols, four symbols, seven symbols, or 14 symbols, to describe in detail the uplink control channel transmission. For details, refer to FIG. 13, FIG. 14, FIG. 15A, FIG. 15B, FIG. 16, FIG. 17A, and FIG. 17B.

Figure 13:
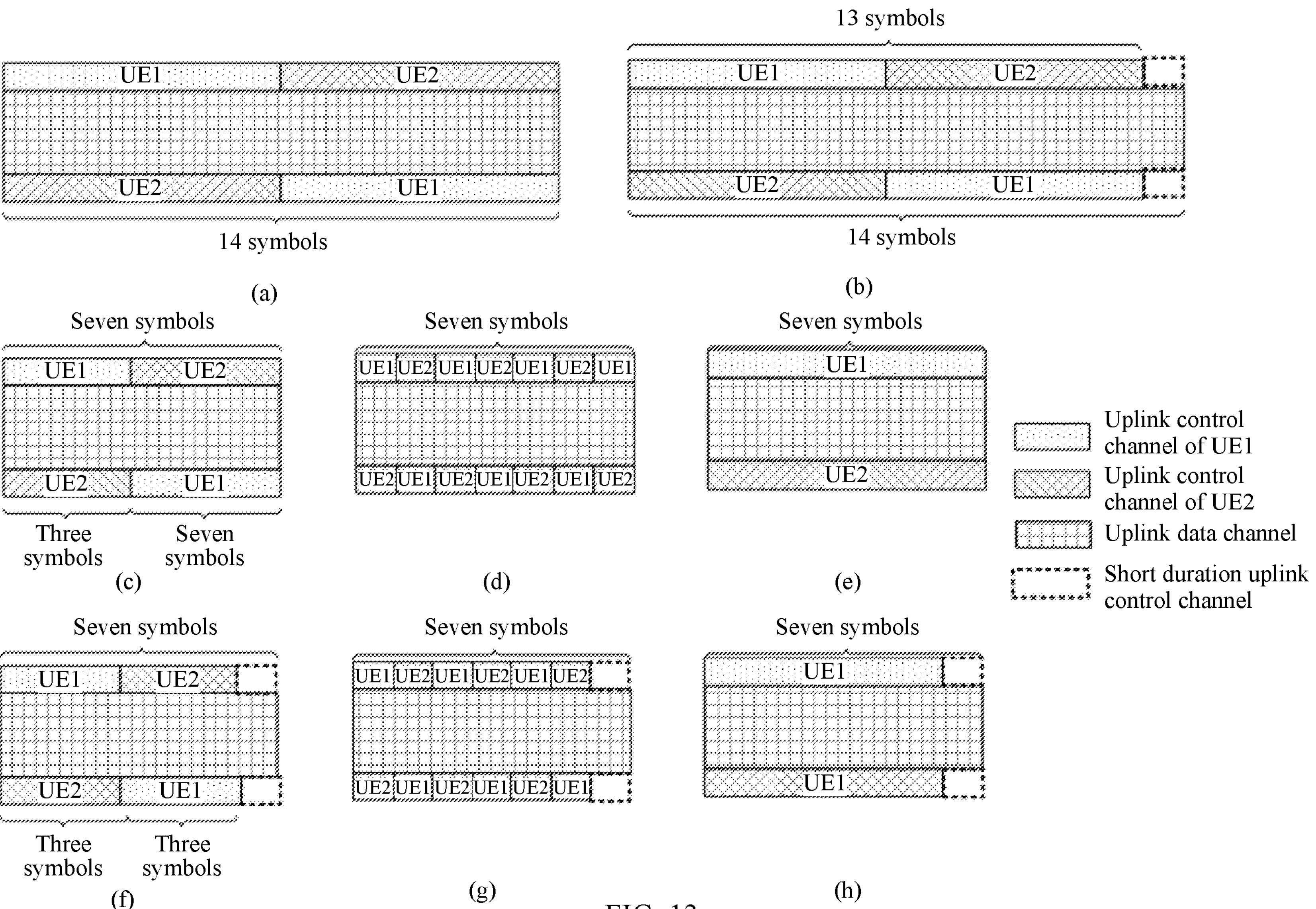
FIG. 13 is a schematic diagram of different formats of uplink control channels in Embodiment 12 of an uplink control channel transmission method according to this application.

FIG. 13 is a schematic diagram of different formats of uplink control channels in Embodiment 12 of an uplink control channel transmission method according to this application. Referring to FIG. 13, frequency division multiplexing is used for an uplink control channel and an uplink data (UL data) channel, so that a plurality of UEs use a same format of an uplink control channel by using frequency diversity.

In (a), the first timeslot or subframe includes 14 symbols, and may include one first-format uplink control channel occupying the 14 symbols, that is, include one long duration UL control channel. The first-format uplink control channel may be occupied by UE1 and UE2, and the UE1 and the UE2 use different frequency domain resources in different time domains by using frequency diversity. For example, the 14 symbols are equally divided into two parts. In first seven symbols, the UE1 and the UE2 respectively occupy two ends of system bandwidth. In following seven symbols, a frequency domain resource previously occupied by the UE1 is occupied by the UE2, and a frequency domain resource previously occupied by the UE2 is occupied by the UE1.

In (b), the first timeslot or subframe includes 14 symbols. The first timeslot or subframe includes one first-format uplink control channel occupying 13 symbols and one second-format uplink control channel occupying one symbol. The first-format uplink control channel is a long duration UL control channel and the second-format uplink control channel is a short duration UL control channel. The first-format uplink control channel may be occupied by UE1 and UE2, and the UE1 and the UE2 use different frequency domain resources in different time domains by using frequency diversity. The second-format uplink control channel may also be used by a plurality of UEs.

In (c), the first timeslot or subframe includes seven symbols. The first timeslot or subframe includes one first-format uplink control channel occupying the seven symbols. In other words, the first timeslot or subframe includes one long duration UL control channel. The first-format uplink control channel may be occupied by UE1 and UE2, and the UE1 and the UE2 use different frequency domain resources in different time domains by using frequency diversity. For example, the seven symbols are divided into two parts. In first three symbols, the UE1 and the UE2 respectively occupy two ends of system bandwidth. In following four symbols, a frequency domain resource previously occupied by the UE1 is occupied by the UE2, and a frequency domain resource previously occupied by the UE2 is occupied by the UE1. In addition, another frequency diversity solution may be used. For example, the UE1 and the UE2 separately occupy one symbol to perform sending at an interval, as shown in (d). For another example, no frequency diversity solution is used. For example, the UE1 and the UE2 respectively occupy two ends of a frequency band to perform sending, as shown in (e).

In (f), the first timeslot or subframe includes seven symbols. The first timeslot or subframe includes one first-format uplink control channel occupying six symbols and one second-format uplink control channel occupying one symbol. The first-format uplink control channel is a long duration UL control channel and the second-format uplink control channel is a short duration UL control channel. The first-format uplink control channel may be occupied by UE1 and UE2, and the UE1 and the UE2 use different frequency domain resources in different time domains by using frequency diversity. For example, the six symbols are equally divided into two parts. In first three symbols, the UE1 and the UE2 respectively occupy two ends of system bandwidth. In following three symbols, a frequency domain resource previously occupied by the UE1 is occupied by the UE2, and a frequency domain resource previously occupied by the UE2 is occupied by the UE1. For another example, the UE1 and the UE2 separately occupy one symbol to perform sending at an interval, as shown in (g). For another example, no frequency diversity solution is used. For example, the UE1 and the UE2 respectively occupy two ends of a frequency band to perform sending, as shown in (h). The second-format uplink control channel may also be used by a plurality of UEs.

Figure 14:
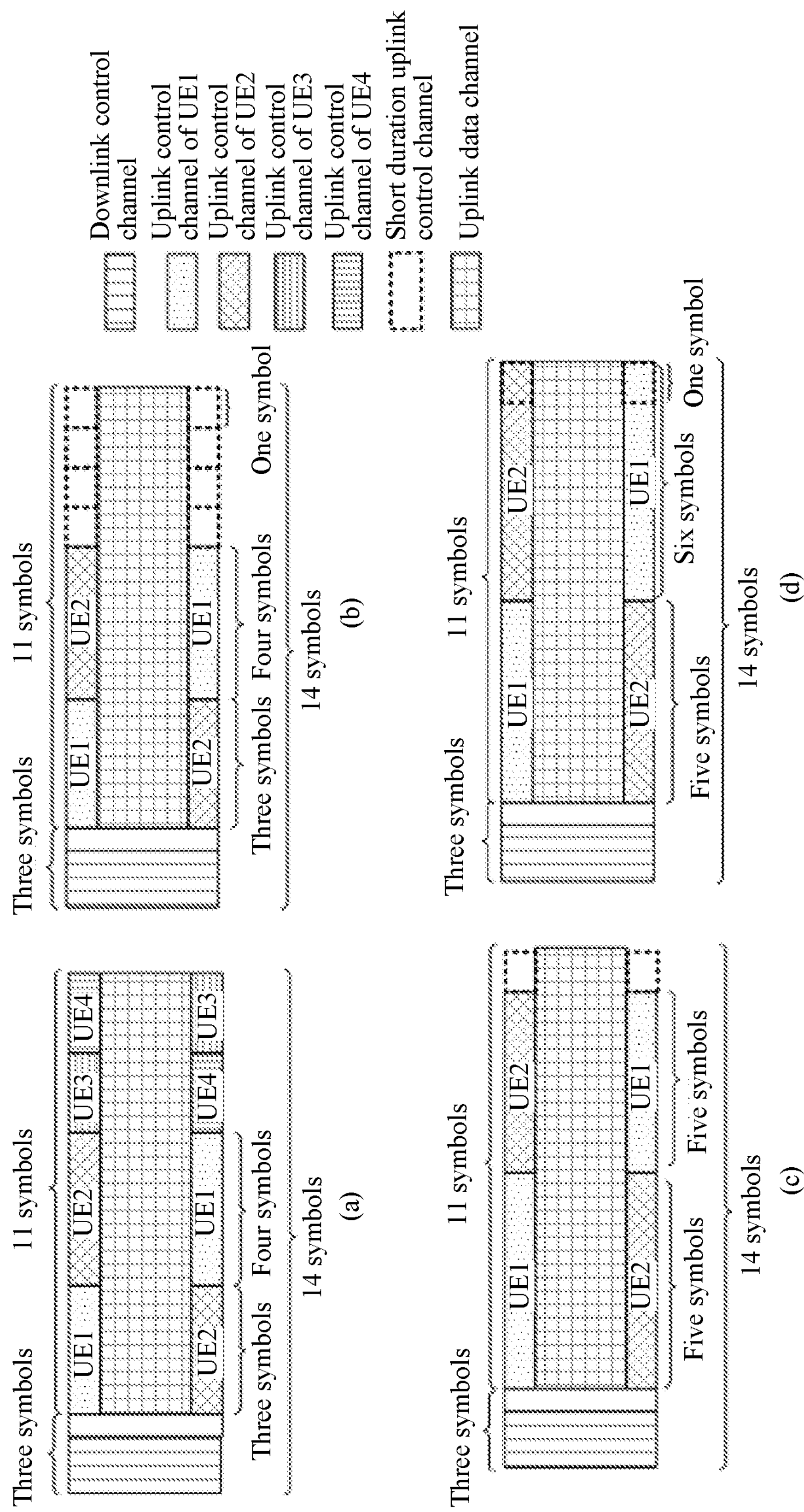
FIG. 14 is a schematic diagram of different formats of uplink control channels in Embodiment 13 of an uplink control channel transmission method according to this application.

FIG. 14 is a schematic diagram of different formats of uplink control channels in Embodiment 13 of an uplink control channel transmission method according to this application.

In (a), the first timeslot or subframe includes 14 symbols. First three symbols are a downlink transmission resource and a gap (Gap), and remaining 11 symbols are an uplink transmission resource. The first timeslot or subframe includes one first-format uplink control channel occupying seven symbols and one second-format uplink control channel occupying four symbols. Both the first-format uplink control channel and the second-format uplink control channel are long duration UL control channels. The first-format uplink control channel may be used by UE1 and UE2, and the UE1 and the UE2 use different frequency domain resources in different time domains by using frequency diversity. The second-format uplink control channel may be used by UE3 and UE4, and the UE3 and the UE4 use different frequency domain resources in different time domains by using frequency diversity. In addition, uplink transmission resources occupied by the UE3 and the UE4, that is, the symbols occupied by the second-format uplink control channel, may be reused by the UE1 and the UE2, so that an uplink control channel of the UE1 and the UE2 may occupy 11 symbols.

In (b), the first timeslot or subframe includes 14 symbols, first three symbols are a downlink transmission resource and a gap (Gap), and remaining 11 symbols are an uplink transmission resource. The first timeslot or subframe includes one first-format uplink control channel occupying seven symbols and four second-format uplink control channels each occupying one symbol. The first-format uplink control channel is a long duration UL control channel and the second-format uplink control channels are short duration UL control channels. The first-format uplink control channel may be used by UE1 and UE2, and the UE1 and the UE2 use different frequency domain resources in different time domains by using frequency diversity. For details, refer to (c), (d), and (e) of FIG. 13.

Although last four symbols are corresponding to four short duration UL control channels in (b), this embodiment of this application is not limited thereto. In another feasible implementation, for example, the last four symbols include two short duration UL control channels each occupying two symbols. For another example, the last four symbols include one short duration UL control channel occupying two symbols and two short duration UL control channels each occupying one symbol, where an arrangement order may be flexibly set.

In (c), the first timeslot or subframe includes 14 symbols, first three symbols are a downlink transmission resource and a gap (Gap), and remaining 11 symbols are an uplink transmission resource. The first timeslot or subframe includes one first-format uplink control channel occupying 10 symbols and one second-format uplink control channel occupying one symbol. The first-format uplink control channel is a long duration UL control channel and the second-format uplink control channel is a short duration UL control channel. The first-format uplink control channel may be used by UE1 and UE2, and the UE1 and the UE2 use different frequency domain resources in different time domains by using frequency diversity. The symbols occupied by the first-format uplink control channel are completely different from the symbol occupied by the second-format uplink control channel.

In (d), the first timeslot or subframe includes 14 symbols, first three symbols are a downlink transmission resource and a gap (Gap), and remaining 11 symbols are an uplink transmission resource. The first timeslot or subframe includes one first-format uplink control channel occupying 11 symbols and one second-format uplink control channel occupying one symbol. The first-format uplink control channel is a long duration UL control channel and the second-format uplink control channel is a short duration UL control channel. The first-format uplink control channel may be used by UE1 and UE2, and the UE1 and the UE2 use different frequency domain resources in different time domains by using frequency diversity. The one symbol occupied by the second-format uplink control channel is a last symbol of the 11 symbols occupied by the first-format uplink control channel. In other words, the symbols occupied by the first-format uplink control channel are partially the same as the symbol occupied by the second-format uplink control channel.

It should be noted that, although uplink control channels in different formats occupy a same frequency resource in (b), (c), and (d) of FIG. 14A, this embodiment of this application is not limited thereto. In another feasible implementation, frequencies occupied by uplink control channels in different formats are completely different or partially the same.

Figure 15A:
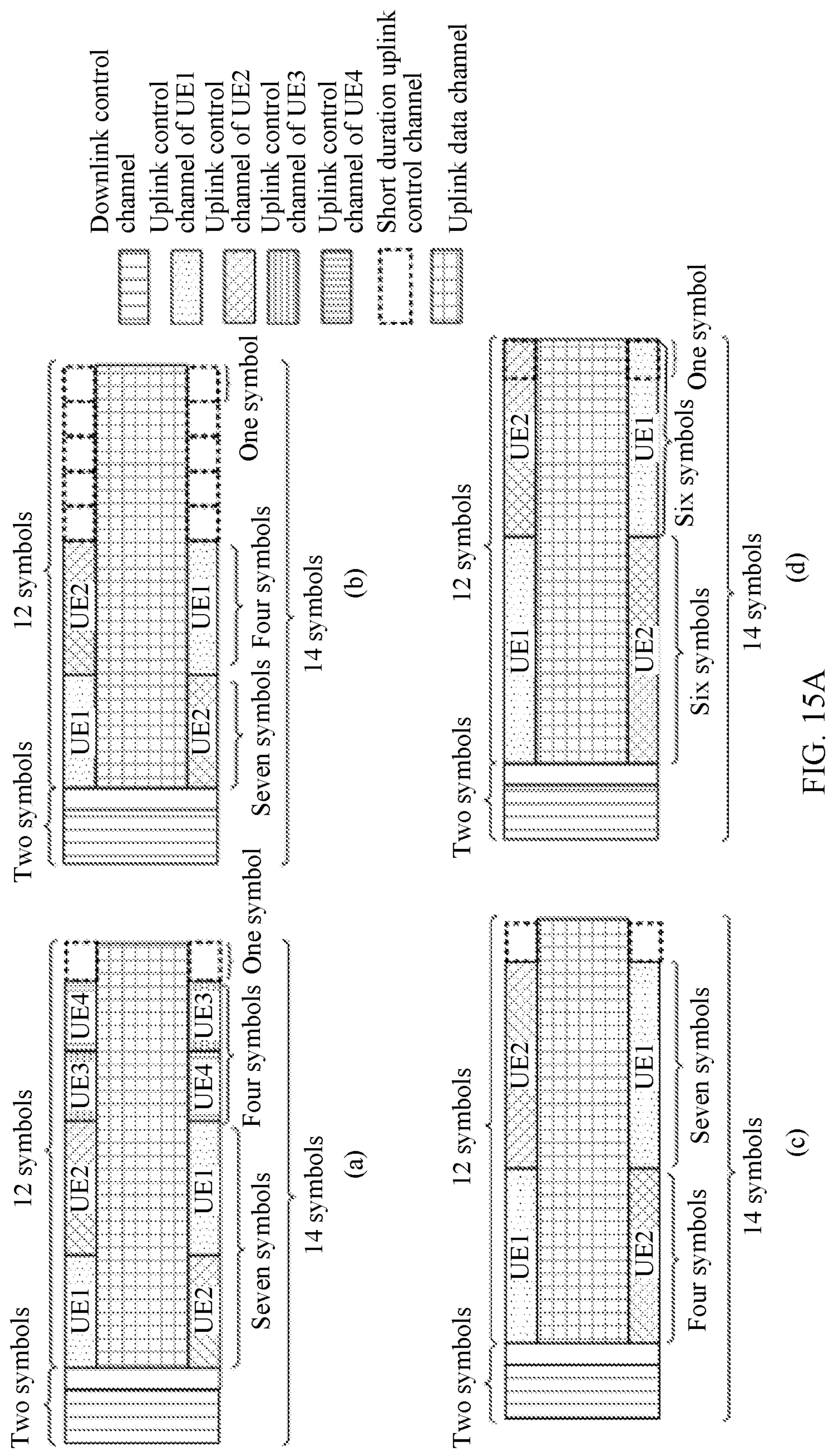
FIG. 15A is a schematic diagram of different formats of uplink control channels in Embodiment 14 of an uplink control channel transmission method according to this application.

FIG. 15A is a schematic diagram of different formats of uplink control channels in Embodiment 14 of an uplink control channel transmission method according to this application.

In (a), the first timeslot or subframe includes 14 symbols. First two symbols are a downlink transmission resource and a gap (Gap), and remaining 12 symbols are an uplink transmission resource. The first timeslot or subframe includes one first-format uplink control channel occupying seven symbols, one second-format uplink control channel occupying four symbols, and one third-format uplink control channel occupying one symbol. Both the first-format uplink control channel and the second-format uplink control channel are long duration UL control channels, and the third-format uplink control channel is a short duration UL control channel. The first-format uplink control channel may be used by UE1 and UE2, and the UE1 and the UE2 use different frequency domain resources in different time domains by using frequency diversity. The second-format uplink control channel may be used by UE3 and UE4, and the UE3 and the UE4 use different frequency domain resources in different time domains by using frequency diversity. In addition, uplink transmission resources occupied by the UE3 and the UE4, that is, the symbols occupied by the second-format uplink control channel, may be reused by the UE1 and the UE2, so that an uplink control channel of the UE1 and the UE2 may occupy 11 symbols.

In (b), the first timeslot or subframe includes 14 symbols, first two symbols are a downlink transmission resource and a gap (Gap), and remaining 12 symbols are an uplink transmission resource. The first timeslot or subframe includes one first-format uplink control channel occupying seven symbols and five second-format uplink control channels each occupying one symbol. The first-format uplink control channel is a long duration UL control channel, and the second-format uplink control channels are short duration UL control channels. The first-format uplink control channel may be used by UE1 and UE2, and the UE1 and the UE2 use different frequency domain resources in different time domains by using frequency diversity. For details, refer to (c), (d), and (e) of FIG. 13.

Although last five symbols are corresponding to five short duration UL control channels in (b), this embodiment of this application is not limited thereto. In another feasible implementation, for example, the last five symbols include two short duration UL control channels each occupying two symbols and one short duration UL control channel occupying one symbol. For another example, the last five symbols include one short duration UL control channel occupying two symbols and three short duration UL control channels each occupying one symbol, where an arrangement order may be flexibly set.

In (c), the first timeslot or subframe includes 14 symbols, first two symbols are a downlink transmission resource and a gap (Gap), and remaining 12 symbols are an uplink transmission resource. The first timeslot or subframe includes one first-format uplink control channel occupying 11 symbols and one second-format uplink control channel occupying one symbol. The first-format uplink control channel is a long duration UL control channel and the second-format uplink control channel is a short duration UL control channel. The first-format uplink control channel may be used by UE1 and UE2, and the UE1 and the UE2 use different frequency domain resources in different time domains by using frequency diversity. The symbols occupied by the first-format uplink control channel are completely different from the symbol occupied by the second-format uplink control channel.

In (d), the first timeslot or subframe includes 14 symbols, first two symbols are a downlink transmission resource and a gap (Gap), and remaining 12 symbols are an uplink transmission resource. The first timeslot or subframe includes one first-format uplink control channel occupying 12 symbols and one second-format uplink control channel occupying one symbol. The first-format uplink control channel is a long duration UL control channel and the second-format uplink control channel is a short duration UL control channel. The first-format uplink control channel may be used by UE1 and UE2, and the UE1 and the UE2 use different frequency domain resources in different time domains by using frequency diversity. The one symbol occupied by the second-format uplink control channel is a last symbol of the 12 symbols occupied by the first-format uplink control channel. In other words, the symbols occupied by the first-format uplink control channel are partially the same as the symbol occupied by the second-format uplink control channel.

It should be noted that, although uplink control channels in different formats occupy a same frequency resource in (a), (b), (c), and (d) of FIG. 15A, this embodiment of this application is not limited thereto. In another feasible implementation, frequencies occupied by uplink control channels in different formats are completely different or partially the same. For details, refer to FIG. 15B.

Figure 15B:
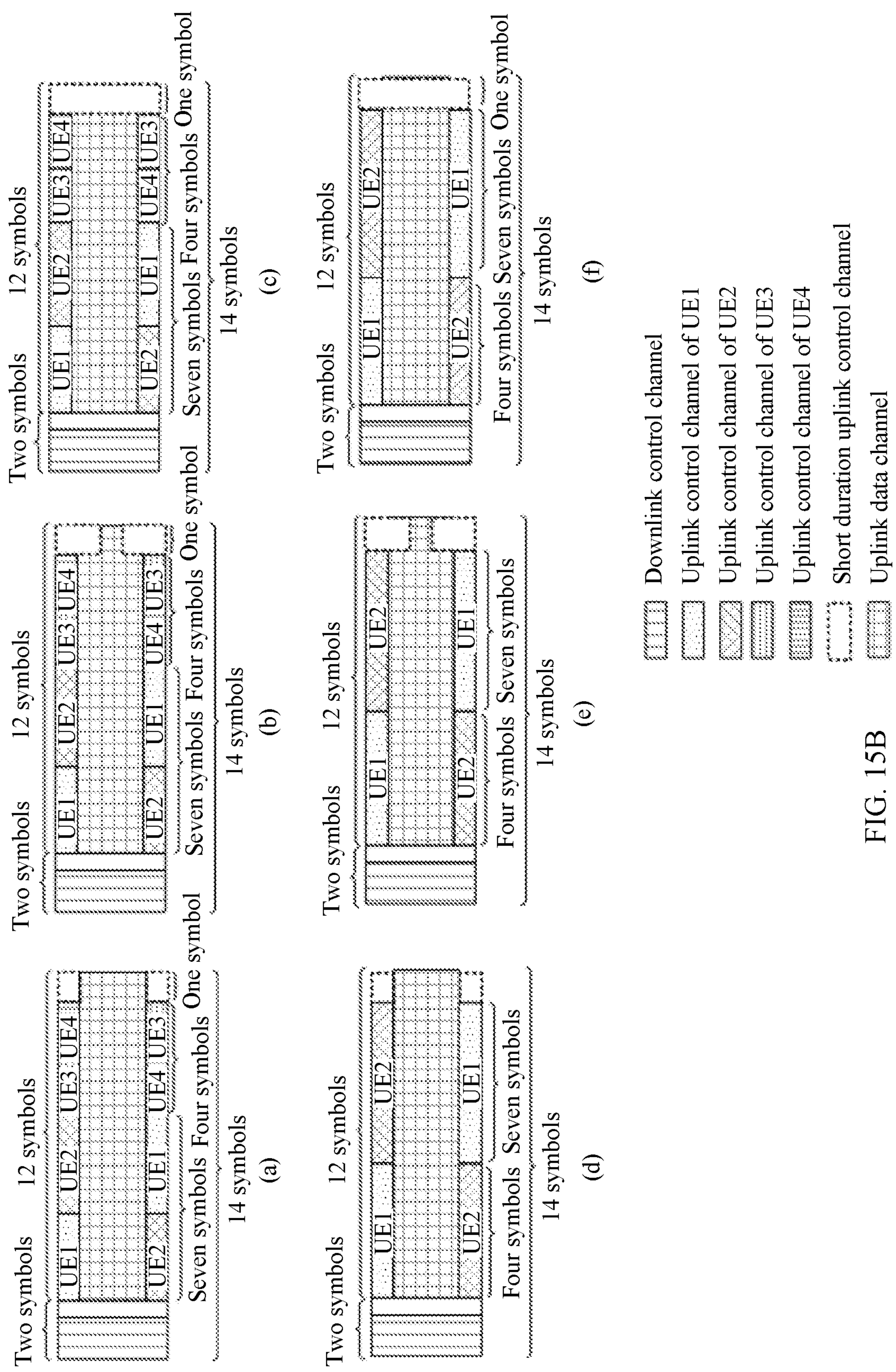
FIG. 15B is another schematic diagram of different formats of uplink control channels in Embodiment 14 of an uplink control channel transmission method according to this application.

FIG. 15B is another schematic diagram of different formats of uplink control channels in Embodiment 14 of an uplink control channel transmission method according to this application.

From comparison between (a), (b), and (c), it is found that in (a), the first-format uplink control channel (used by the UE1 and the UE2), the second-format uplink control channel (used by the UE3 and the UE4), and the third-format uplink control channel occupy a same frequency resource, that is, all occupy two ends of a system frequency band; in (b), the first-format uplink control channel and the second-format uplink control channel occupy a same frequency resource, that is, both occupy two ends of a system frequency band, and the third-format uplink control channel occupies more frequency resources than those occupied by the first-format uplink control channel and the second-format uplink control channel; and in (c), the first-format uplink control channel and the second-format uplink control channel occupy a same frequency resource, that is, both occupy two ends of a system frequency band, and the third-format uplink control channel occupies all frequency resources of the system frequency band.

Likewise, from comparison between (d), (e), and (f), it is founded that in (d), the first-format uplink control channel (used by the UE1), the second-format uplink control channel (used by the UE2), and the third-format uplink control channel occupy a same frequency resource, that is, all occupy two ends of a system frequency band; in (b), the first-format uplink control channel and the second-format uplink control channel occupy a same frequency resource, that is, both occupy two ends of a system frequency band, and the third-format uplink control channel occupies more frequency resources than those occupied by the first-format uplink control channel and the second-format uplink control channel; and in (c), the first-format uplink control channel and the second-format uplink control channel occupy a same frequency resource, that is, both occupy two ends of a system frequency band, and the third-format uplink control channel occupies all frequency resources of the system frequency band.

Figure 16:
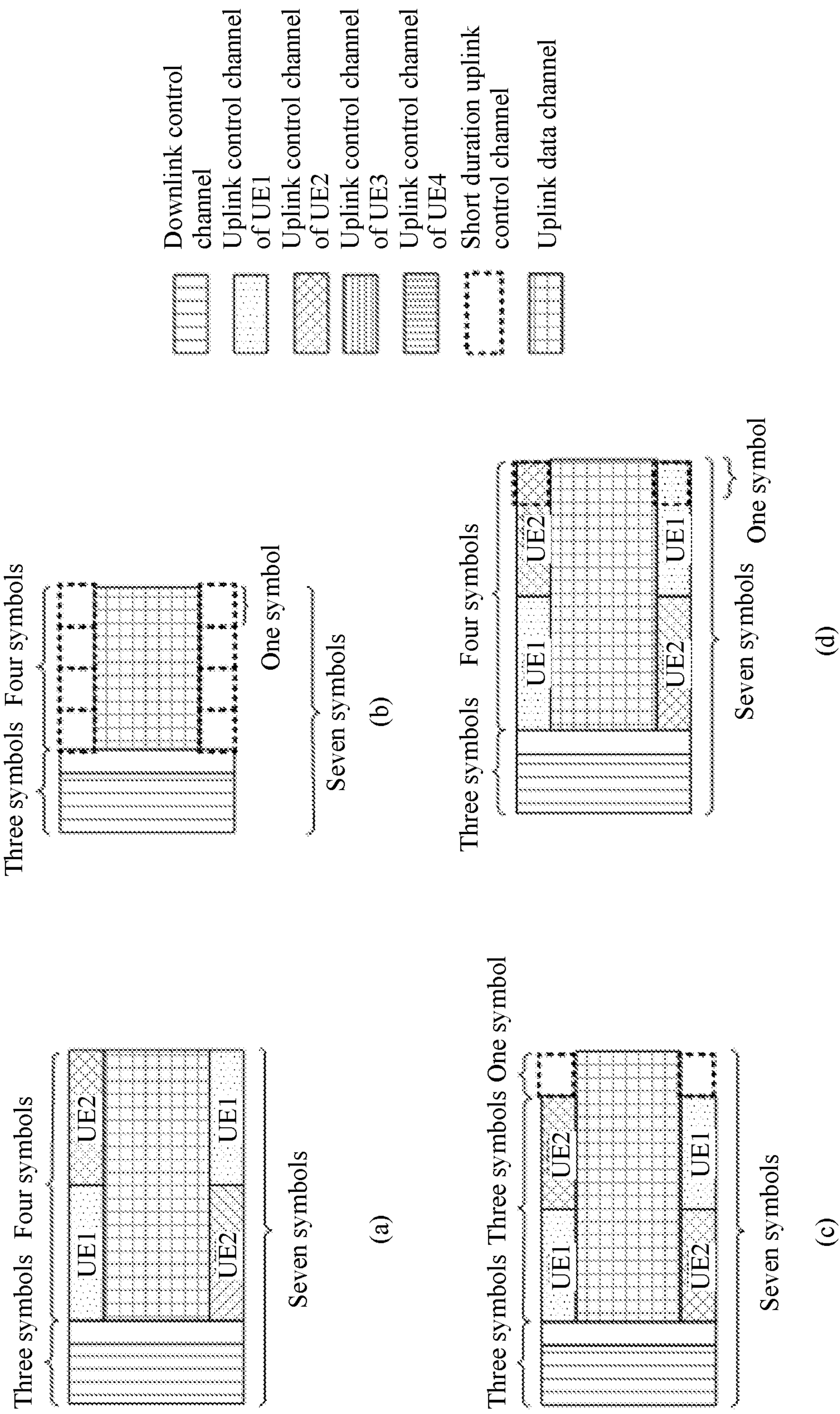
FIG. 16 is a schematic diagram of different formats of uplink control channels in Embodiment 15 of an uplink control channel transmission method according to this application.

FIG. 16 is a schematic diagram of different formats of uplink control channels in Embodiment 15 of an uplink control channel transmission method according to this application.

In (a), the first timeslot or subframe includes seven symbols, first three symbols are a downlink transmission resource and a gap (Gap), and remaining four symbols are an uplink transmission resource. The first timeslot or subframe includes one first-format uplink control channel occupying four symbols, the first-format uplink control channel may be used by UE1 and UE2, and the UE1 and the UE2 use different frequency domain resource in different time domains by using frequency diversity.

In (b), the first timeslot or subframe includes seven symbols, first three symbols are a downlink transmission resource and a gap (Gap), and remaining four symbols are an uplink transmission resource. The first timeslot or subframe includes four short duration UL control channels each occupying one symbol. However, this embodiment of this application is not limited thereto. In another feasible implementation, for example, the four symbols include two short duration UL control channels each occupying two symbols. For another example, the four symbols include one short duration UL control channel occupying two symbols and two short duration UL control channels each occupying one symbol, where an arrangement order may be flexibly set.

In (c), the first timeslot or subframe includes seven symbols, first three symbols are a downlink transmission resource and a gap (Gap), and remaining one symbol is an uplink transmission resource. The first timeslot or subframe includes one first-format uplink control channel occupying three symbols and one second-format uplink control channel occupying one symbol. The first-format uplink control channel is a long duration UL control channel and the second-format uplink control channel is a short duration UL control channel. The first-format uplink control channel may be used by UE1 and UE2, and the UE1 and the UE2 use different frequency domain resources in different time domains by using frequency diversity. The symbols occupied by the first-format uplink control channel are completely different from the symbol occupied by the second-format uplink control channel.

In (d), the first timeslot or subframe includes seven symbols, first three symbols are a downlink transmission resource and a gap (Gap), and remaining one symbol is an uplink transmission resource. The first timeslot or subframe includes one first-format uplink control channel occupying four symbols and one second-format uplink control channel occupying one symbol. The first-format uplink control channel is a long duration UL control channel and the second-format uplink control channel is a short duration UL control channel. The first-format uplink control channel may be used by UE1 and UE2, and the UE1 and the UE2 use different frequency domain resources in different time domains by using frequency diversity. The one symbol occupied by the second-format uplink control channel is a last symbol of the four symbols occupied by the first-format uplink control channel. In other words, the symbols occupied by the first-format uplink control channel are partially the same as the symbol occupied by the second-format uplink control channel.

Figure 17A:
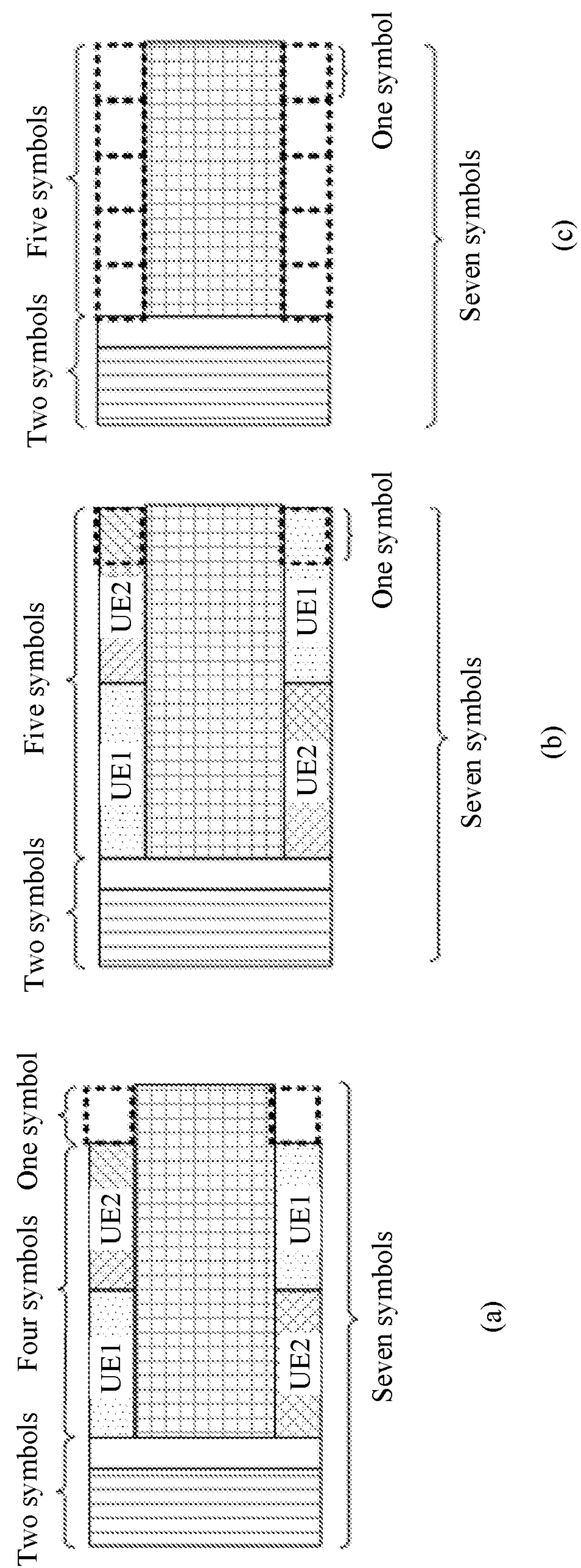
FIG. 17A is a schematic diagram of different formats of uplink control channels in Embodiment 16 of an uplink control channel transmission method according to this application.

FIG. 17A is a schematic diagram of different formats of uplink control channels in Embodiment 16 of an uplink control channel transmission method according to this application.

In (a), the first timeslot or subframe includes seven symbols. First two symbols are a downlink transmission resource and a gap (Gap), and remaining five symbols are an uplink transmission resource. The first timeslot or subframe includes one first-format uplink control channel occupying four symbols and one second-format uplink control channel occupying one symbol. The first-format uplink control channel is a long duration UL control channel and the second-format uplink control channel is a short duration UL control channel. The first-format uplink control channel may be used by UE1 and UE2, and the UE1 and the UE2 use different frequency domain resources in different time domains by using frequency diversity. The one symbol occupied by the second-format uplink control channel is a last symbol of the remaining five symbols. In other words, the symbols occupied by the first-format uplink control channel are completely different from the symbol occupied by the second-format uplink control channel.

In (b), the first timeslot or subframe includes seven symbols, first two symbols are a downlink transmission resource and a gap (Gap), and remaining five symbols are an uplink transmission resource. The first timeslot or subframe includes one first-format uplink control channel occupying five symbols and one second-format uplink control channel occupying one symbol. The first-format uplink control channel is a long duration UL control channel and the second-format uplink control channel is a short duration UL control channel. The first-format uplink control channel may be used by UE1 and UE2, and the UE1 and the UE2 use different frequency domain resources in different time domains by using frequency diversity. The one symbol occupied by the second-format uplink control channel is any one of the five symbols occupied by the first-format uplink control channel. In other words, the symbols occupied by the first-format uplink control channel are partially the same as the symbol occupied by the second-format uplink control channel.

In (c), the first timeslot or subframe includes seven symbols, first two symbols are a downlink transmission resource and a gap (Gap), and remaining five symbols are an uplink transmission resource. The first timeslot or subframe includes five short duration UL control channels each occupying one symbol. However, this embodiment of this application is not limited thereto. In another feasible implementation, for example, the five symbols include two short duration UL control channels each occupying two symbols and one short duration UL control channel occupying one symbol. For another example, the five symbols include one short duration UL control channel occupying two symbols and three short duration UL control channels each occupying one symbol, where an arrangement order may be flexibly set.

It should be noted that, although uplink control channels in different formats occupy a same frequency resource in (a) and (b) of FIG. 17A, this embodiment of this application is not limited thereto. In another feasible implementation, frequencies occupied by uplink control channels in different formats are completely different or partially the same. For details, refer to FIG. 17B.

Figure 17B:
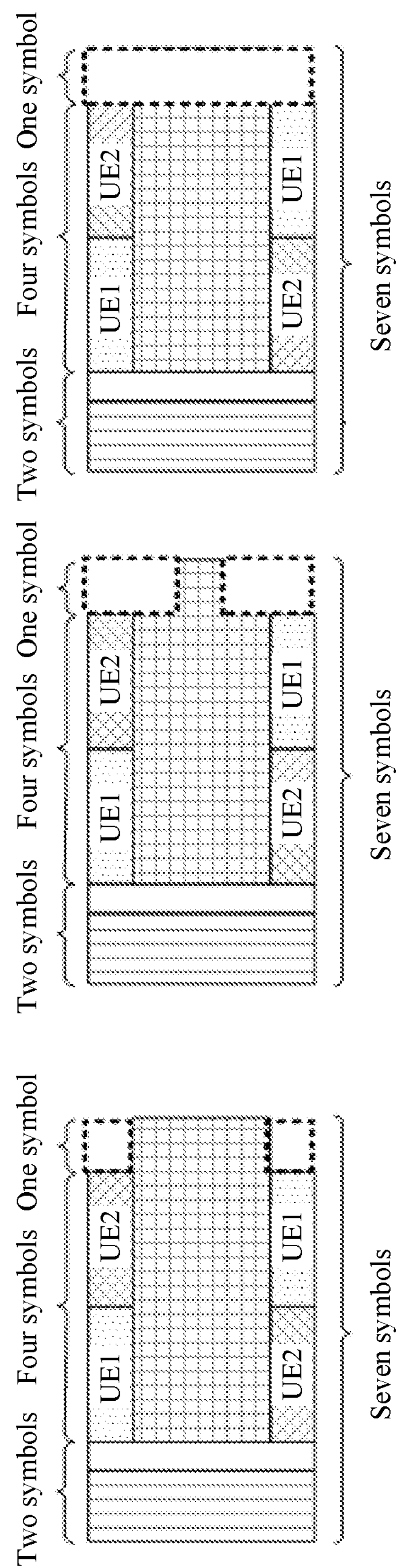
FIG. 17B is another schematic diagram of different formats of uplink control channels in Embodiment 16 of an uplink control channel transmission method according to this application.

FIG. 17B is another schematic diagram of different formats of uplink control channels in Embodiment 16 of an uplink control channel transmission method according to this application.

From comparison between (a), (b), and (c), it is found that in (a), the first-format uplink control channel (used by the UE1 and the UE2) and the second-format uplink control channel (namely, a short duration UL control channel occupying one symbol) occupy a same frequency resource, that is, both occupy two ends of a system frequency band; in (b), the first-format uplink control channel occupies frequency resources at two ends of a system frequency band, and the second-format uplink control channel occupies more frequency resources than those occupied by the first-format uplink control channel; and in (c), the first-format uplink control channel occupies frequency resources at two ends of a system frequency band, and the second-format uplink control channel occupies all frequency resources of the system frequency band.

Figure 18:
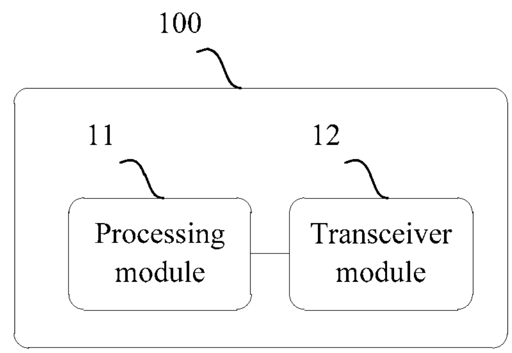
FIG. 18 is a schematic structural diagram of Embodiment 1 of an uplink control channel transmission apparatus according to this application.

FIG. 18 is a schematic structural diagram of Embodiment 1 of an uplink control channel transmission apparatus according to this application. The uplink control channel transmission apparatus provided in this embodiment can implement steps of the method that is applied to the uplink control channel transmission apparatus and that is provided in any embodiment of this application. Specifically, the uplink control channel transmission apparatus 100 provided in this embodiment includes:

a processing module 11, configured to generate a first timeslot or subframe including at least one first-format uplink control channel and at least one second-format uplink control channel, where the first-format uplink control channel occupies N symbols of the first timeslot or subframe, the second-format uplink control channel occupies M symbols of the first timeslot or subframe, and N is greater than or equal to M; and a transceiver module 12, configured to transmit the first timeslot or subframe.

According to the uplink control channel transmission apparatus provided in this embodiment of this application, the at least one first-format uplink control channel and the at least one second-format uplink control channel are added to the first timeslot or subframe, and then the first timeslot or subframe including the at least one first-format uplink control channel and the at least one second-format uplink control channel is transmitted. In the process, there are only two formats of uplink control channels, so that uplink scheduling complexity is reduced.

Optionally, in an embodiment of this application, a symbol occupied by at least one of the at least one first-format uplink control channel is completely different from or partially the same as a symbol occupied by at least one of the at least one second-format uplink control channel.

Optionally, in an embodiment of this application, at least one of the at least one first-format uplink control channel occupies a first frequency resource, at least one of the at least one second-format uplink control channel occupies a second frequency resource, and the first frequency resource is completely different from or partially the same as the second frequency resource.

Optionally, in an embodiment of this application, the first frequency resource occupies two ends of a system frequency band, and the second frequency resource occupies all or a part of the system frequency band, or the second frequency occupies a part of the system frequency band except the first frequency resource.

Optionally, in an embodiment of this application, the first timeslot or subframe further includes at least one third-format uplink control channel; and a symbol occupied by at least one of the at least one third-format uplink control channel is completely different from or partially the same as the symbol occupied by the at least one of the at least one first-format uplink control channel; or a symbol occupied by at least one of the at least one third-format uplink control channel is completely different from or partially the same as the symbol occupied by the at least one of the at least one second-format uplink control channel.

Optionally, in an embodiment of this application, the at least one of the at least one first-format uplink control channel occupies the first frequency resource, the at least one of the at least one second-format uplink control channel occupies the second frequency resource, the at least one third-format uplink control channel of the at least one third-format uplink control channel format occupies a third frequency resource, and the first frequency resource is completely different from or partially the same as the second frequency resource; and the third frequency resource is completely different from or partially the same as the first frequency resource, or the third frequency resource is completely different from or partially the same as the second frequency resource.

Optionally, in an embodiment of this application, the third frequency occupies all or a part of the system frequency band, or the third frequency occupies a part of the system frequency band except the first frequency resource and the second frequency resource.

Optionally, in an embodiment of this application, the first-format uplink control channel, the second-format uplink control channel, or the third-format uplink control channel occupies at least two parts of frequency resources, and at least two of the at least two parts of frequency resources are different.

Optionally, in an embodiment of this application, the at least one first-format uplink control channel is specifically one first-format uplink control channel, and the at least one second-format uplink control channel is specifically one second-format uplink control channel, where the first-format uplink control channel occupies seven symbols of the first timeslot or subframe, the second-format uplink control channel occupies four symbols of the first timeslot or subframe, and the seven symbols are completely different from or partially the same as the four symbols in the first timeslot or subframe; or the first-format uplink control channel occupies 10 symbols of the first timeslot or subframe, the second-format uplink control channel occupies one symbol of the first timeslot or subframe, and the 10 symbols are completely different from or partially the same as the one symbol in the first timeslot or subframe; or the first-format uplink control channel occupies 11 symbols of the first timeslot or subframe, the second-format uplink control channel occupies one symbol of the first timeslot or subframe, and the 11 symbols are completely different from or partially the same as the one symbol in the first timeslot or subframe; or the first-format uplink control channel occupies 13 symbols of the first timeslot or subframe, the second-format uplink control channel occupies one symbol of the first timeslot or subframe, and the 13 symbols are completely different from or partially the same as the one symbol in the first timeslot or subframe; or the first-format uplink control channel occupies six symbols of the first timeslot or subframe, the second-format uplink control channel occupies one symbol of the first timeslot or subframe, and the six symbols are completely different from or partially the same as the one symbol in the first timeslot or subframe; or the first-format uplink control channel occupies four symbols of the first timeslot or subframe, the second-format uplink control channel occupies one symbol of the first timeslot or subframe, and the four symbols are completely different from or partially the same as the one symbol in the first timeslot or subframe; or the first-format uplink control channel occupies three symbols of the first timeslot or subframe, the second-format uplink control channel occupies one symbol of the first timeslot or subframe, and the three symbols are completely different from or partially the same as the one symbol in the first timeslot or subframe.

Optionally, in an embodiment of this application, the at least one first-format uplink control channel is specifically one first-format uplink control channel, the at least one second-format uplink control channel is specifically four second-format uplink control channels, the first-format uplink control channel occupies seven symbols of the first timeslot or subframe, each of the four second-format uplink control channels occupies one symbol of the first timeslot or subframe, and the seven symbols are completely different from or partially the same as the one symbol in the first timeslot or subframe; or the at least one first-format uplink control channel is specifically one first-format uplink control channel, the at least one second-format uplink control channel is specifically five second-format uplink control channels, the first-format uplink control channel occupies seven symbols of the first timeslot or subframe, each of the five second-format uplink control channels occupies one symbol of the first timeslot or subframe, and the seven symbols are completely different from or partially the same as the one symbol in the first timeslot or subframe.

Optionally, in an embodiment of this application, the at least one first-format uplink control channel is specifically one first-format uplink control channel, the at least one second-format uplink control channel is specifically one second-format uplink control channel, the at least one third-format uplink control channel is specifically one third-format uplink control channel, the first-format uplink control channel occupies seven symbols of the first timeslot or subframe, the second-format uplink control channel occupies four symbols of the first timeslot or subframe, the third-format uplink control channel occupies one symbol of the first timeslot or subframe, and the seven symbols, the four symbols, and the one symbol are completely different or partially the same in the first timeslot or subframe.

Figure 19:
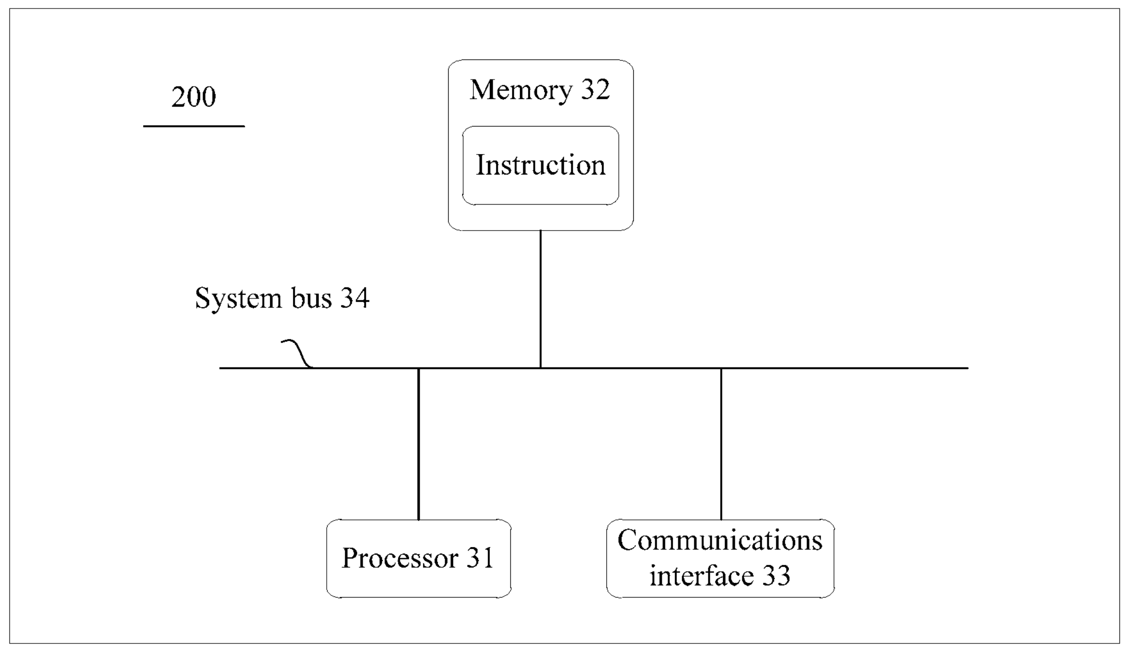
FIG. 19 is a schematic structural diagram of Embodiment 2 of an uplink control channel transmission apparatus according to this application.

FIG. 19 is a schematic structural diagram of Embodiment 2 of an uplink control channel transmission apparatus according to this application. The uplink control channel transmission apparatus 200 provided in this embodiment includes a processor 21, a memory 22, a communications interface 23, and a system bus 24. The memory 22 and the communications interface 23 are connected to the processor 21 by using the system bus 24, to complete communication with each other. The memory 21 is configured to store a computer executable instruction. The communications interface 23 is configured to communicate with another device. The processor 21 is configured to run the computer executable instruction, so that the uplink control channel transmission apparatus performs all steps of the method applied to the uplink control channel transmission apparatus.

The system bus in FIG. 19 may be a peripheral component interconnect (peripheral component interconnect, PCI) bus, an extended industry standard architecture (extended industry standard architecture, EISA) bus, or the like. The system bus may be classified into an address bus, a data bus, a control bus, and the like. For ease of representation, only one thick line is used to represent the bus in the figure, but this does not mean that there is only one bus or only one type of bus. The communications interface is configured to implement communication between a database access apparatus and another device (such as a client, a read/write database, or a read-only database). The memory may include a random access memory (random access memory, RAM), or may further include a non-volatile memory (non-volatile memory), for example, at least one magnetic disk storage.

The processor may be a general purpose processor, including a central processing unit (Central Processing Unit, CPU), a network processor (Network Processor, NP), and the like; or may be a digital signal processor (Digital Signal Processing, DSP), an application-specific integrated circuit (Application Specific Integrated Circuit, ASIC), a field-programmable gate array (Field-Programmable Gate Array, FPGA) or another programmable logic device, a discrete gate or transistor logic device, or discrete hardware component.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes various media that can store program code, such as a ROM, a RAM, a magnetic disk, or an optical disc.

What is claimed is:

1. An uplink control channel transmission method performed by a terminal, comprising:

generating one first-format uplink control channel and one second-format uplink control channel, wherein the first-format uplink control channel occupies N symbols of a first timeslot or subframe, wherein the second-format uplink control channel occupies M symbols of the first timeslot or subframe, wherein M and N are positive integers, and wherein N is greater than or equal to M; and transmitting, to a network side device, the first-format uplink control channel and the second-format uplink control channel that are comprised in completely different symbols of the first timeslot or subframe.

2. The method according to claim 1, wherein the first-format uplink control channel occupies a first frequency resource, the second-format uplink control channel occupies a second frequency resource, and the first frequency resource is completely different from the second frequency resource.

3. The method according to claim 1, wherein:

the first timeslot or subframe further comprises at least one third-format uplink control channel; and a symbol occupied by at least one of the at least one third-format uplink control channel is completely different from or partially the same as the symbol occupied by the first-format uplink control channel; or a symbol occupied by at least one of the at least one third-format uplink control channel is completely different from or partially the same as the symbol occupied by the second-format uplink control channel.

4. The method according to claim 3, wherein the first-format uplink control channel occupies a first frequency resource, wherein the second-format uplink control channel occupies a second frequency resource, wherein the at least one third-format uplink control channel of the at least one third-format uplink control channel occupies a third frequency resource, and wherein the first frequency resource is completely different from or partially the same as the second frequency resource; and wherein the third frequency resource is completely different from or partially the same as the first frequency resource, or the third frequency resource is completely different from or partially the same as the second frequency resource.

5. The method according to claim 4, wherein:

the third frequency resource occupies all or a part of a system frequency band; or the third frequency resource occupies a part of the system frequency band except the first frequency resource and the second frequency resource.

6. The method according to claim 1, wherein transmitting, to a network side device, the first-format uplink control channel and the second-format uplink control channel that are comprised in completely different symbols of the first timeslot or subframe comprises at least one of the following:

the first-format uplink control channel occupies seven symbols of the first timeslot or subframe, the second-format uplink control channel occupies four symbols of the first timeslot or subframe, and the seven symbols are completely different from the four symbols in the first timeslot or subframe;

the first-format uplink control channel occupies 10 symbols of the first timeslot or subframe, the second-format uplink control channel occupies one symbol of the first timeslot or subframe, and the 10 symbols are completely different from the one symbol in the first timeslot or subframe;

the first-format uplink control channel occupies 11 symbols of the first timeslot or subframe, the second-format uplink control channel occupies one symbol of the first timeslot or subframe, and the 11 symbols are completely different from the one symbol in the first timeslot or subframe;

the first-format uplink control channel occupies 13 symbols of the first timeslot or subframe, the second-format uplink control channel occupies one symbol of the first timeslot or subframe, and the 13 symbols are completely different from the one symbol in the first timeslot or subframe;

the first-format uplink control channel occupies six symbols of the first timeslot or subframe, the second-format uplink control channel occupies one symbol of the first timeslot or subframe, and the six symbols are completely different from the one symbol in the first timeslot or subframe;

the first-format uplink control channel occupies four symbols of the first timeslot or subframe, the second-format uplink control channel occupies one symbol of the first timeslot or subframe, and the four symbols are completely different from the one symbol in the first timeslot or subframe; or the first-format uplink control channel occupies three symbols of the first timeslot or subframe, the second-format uplink control channel occupies one symbol of the first timeslot or subframe, and the three symbols are completely different from or partially the same as the one symbol in the first timeslot or subframe.

7. An uplink control channel reception method, performed by a network side device, the method comprising:

receiving, from a terminal, one first-format uplink control channel and one second-format uplink control channel, wherein the first-format uplink control channel and the second-format uplink control channel that are comprised in completely different symbols of a first timeslot or subframe, wherein the first-format uplink control channel occupies N symbols of the first timeslot or subframe, wherein the second-format uplink control channel occupies M symbols of the first timeslot or subframe, wherein M and N are positive integers, wherein N is greater than or equal to M.

8. The method of claim 7, wherein receiving, from a terminal, one first-format uplink control channel and one second-format uplink control channel, wherein the first-format uplink control channel and the second-format uplink control channel that are comprised in completely different symbols of a first timeslot or subframe, comprising:

the first-format uplink control channel occupies seven symbols of the first timeslot or subframe, the second-format uplink control channel occupies four symbols of the first timeslot or subframe, and the seven symbols are completely different from the four symbols in the first timeslot or subframe;

the first-format uplink control channel occupies 10 symbols of the first timeslot or subframe, the second-format uplink control channel occupies one symbol of the first timeslot or subframe, and the 10 symbols are completely different from the one symbol in the first timeslot or subframe;

the first-format uplink control channel occupies 11 symbols of the first timeslot or subframe, the second-format uplink control channel occupies one symbol of the first timeslot or subframe, and the 11 symbols are completely different from the one symbol in the first timeslot or subframe;

the first-format uplink control channel occupies 13 symbols of the first timeslot or subframe, the second-format uplink control channel occupies one symbol of the first timeslot or subframe, and the 13 symbols are completely different from the one symbol in the first timeslot or subframe;

the first-format uplink control channel occupies six symbols of the first timeslot or subframe, the second-format uplink control channel occupies one symbol of the first timeslot or subframe, and the six symbols are completely different from the one symbol in the first timeslot or subframe;

the first-format uplink control channel occupies four symbols of the first timeslot or subframe, the second-format uplink control channel occupies one symbol of the first timeslot or subframe, and the four symbols are completely different from the one symbol in the first timeslot or subframe; or the first-format uplink control channel occupies three symbols of the first timeslot or subframe, the second-format uplink control channel occupies one symbol of the first timeslot or subframe, and the three symbols are completely different from or partially the same as the one symbol in the first timeslot or subframe.

9. An uplink control channel transmission apparatus, comprising at least one processor, a memory, a communications interface, and a system bus, wherein the memory and the communications interface are connected to the at least one processor by using the system bus, to complete communication with each other, wherein the memory is configured to store a computer executable instruction, wherein the communications interface is configured to communicate with another device, and wherein and the at least one processor is configured to run the computer executable instruction, so that the uplink control channel transmission apparatus performs:

generating one first-format uplink control channel and one second-format uplink control channel, wherein the first-format uplink control channel occupies N symbols of a first timeslot or subframe, wherein the second-format uplink control channel occupies M symbols of the first timeslot or subframe, wherein M and N are positive integers, and wherein N is greater than or equal to M; and transmitting, to a network side device, the first-format uplink control channel and the second-format uplink control channel that are comprised in completely different symbols of the first timeslot or subframe.

10. The apparatus according to claim 9, wherein the first-format uplink control channel occupies a first frequency resource, wherein the second-format uplink control channel occupies a second frequency resource, and wherein the first frequency resource is completely different from the second frequency resource.

11. The apparatus according to claim 9, wherein:

the first timeslot or subframe further comprises at least one third-format uplink control channel; and at least one of the following:

a symbol occupied by at least one of the at least one third-format uplink control channel is completely different from or partially the same as the symbol occupied by the first-format uplink control channel; or a symbol occupied by at least one of the at least one third-format uplink control channel is completely different from or partially the same as the symbol occupied by the second-format uplink control channel.

12. The apparatus according to claim 11, wherein the first-format uplink control channel occupies a first frequency resource, wherein the second-format uplink control channel occupies a second frequency resource, wherein the at least one third-format uplink control channel of the at least one third-format uplink control channel occupies a third frequency resource, and wherein the first frequency resource is completely different from or partially the same as the second frequency resource; and wherein the third frequency resource is completely different from or partially the same as the first frequency resource, or the third frequency resource is completely different from or partially the same as the second frequency resource.

13. The apparatus according to claim 12, wherein the third frequency resource occupies all or a part of a system frequency band, or the third frequency resource occupies a part of the system frequency band except the first frequency resource and the second frequency resource.

14. The apparatus according to claim 9, wherein transmitting, to a network side device, the first-format uplink control channel and the second-format uplink control channel that are comprised in completely different symbols of the first timeslot or subframe comprises at least one of the following:

the first-format uplink control channel occupies seven symbols of the first timeslot or subframe, the second-format uplink control channel occupies four symbols of the first timeslot or subframe, and the seven symbols are completely different from the four symbols in the first timeslot or subframe;

the first-format uplink control channel occupies 10 symbols of the first timeslot or subframe, the second-format uplink control channel occupies one symbol of the first timeslot or subframe, and the 10 symbols are completely different from the one symbol in the first timeslot or subframe;

the first-format uplink control channel occupies 11 symbols of the first timeslot or subframe, the second-format uplink control channel occupies one symbol of the first timeslot or subframe, and the 11 symbols are completely different from the one symbol in the first timeslot or subframe;

the first-format uplink control channel occupies 13 symbols of the first timeslot or subframe, the second-format uplink control channel occupies one symbol of the first timeslot or subframe, and the 13 symbols are completely different from the one symbol in the first timeslot or subframe;

the first-format uplink control channel occupies six symbols of the first timeslot or subframe, the second-format uplink control channel occupies one symbol of the first timeslot or subframe, and the six symbols are completely different from the one symbol in the first timeslot or subframe;

the first-format uplink control channel occupies four symbols of the first timeslot or subframe, the second-format uplink control channel occupies one symbol of the first timeslot or subframe, and the four symbols are completely different from the one symbol in the first timeslot or subframe; or the first-format uplink control channel occupies three symbols of the first timeslot or subframe, the second-format uplink control channel occupies one symbol of the first timeslot or subframe, and the three symbols are completely different from or partially the same as the one symbol in the first timeslot or subframe.

15. An uplink control channel transmission apparatus, comprising at least one processor, a memory, a communications interface, and a system bus, wherein the memory and the communications interface are connected to the at least one processor by using the system bus, to complete communication with each other, wherein the memory is configured to store a computer executable instruction, wherein the communications interface is configured to communicate with another device, and wherein and the at least one processor is configured to run the computer executable instruction, so that the uplink control channel transmission apparatus performs:

receiving, from a terminal, one first-format uplink control channel and one second-format uplink control channel, wherein the first-format uplink control channel and the second-format uplink control channel that are comprised in completely different symbols of a first timeslot or subframe, wherein the first-format uplink control channel occupies N symbols of the first timeslot or subframe, wherein the second-format uplink control channel occupies M symbols of the first timeslot or subframe, wherein M and N are positive integers, wherein N is greater than or equal to M.

16. The apparatus according to claim 15, wherein receiving, from a terminal, one first-format uplink control channel and one second-format uplink control channel, wherein the first-format uplink control channel and the second-format uplink control channel that are comprised in completely different symbols of a first timeslot or subframe comprises at least one of the following:

the first-format uplink control channel occupies seven symbols of the first timeslot or subframe, the second-format uplink control channel occupies four symbols of the first timeslot or subframe, and the seven symbols are completely different from the four symbols in the first timeslot or subframe;

the first-format uplink control channel occupies 10 symbols of the first timeslot or subframe, the second-format uplink control channel occupies one symbol of the first timeslot or subframe, and the 10 symbols are completely different from the one symbol in the first timeslot or subframe;

the first-format uplink control channel occupies 11 symbols of the first timeslot or subframe, the second-format uplink control channel occupies one symbol of the first timeslot or subframe, and the 11 symbols are completely different from the one symbol in the first timeslot or subframe;

the first-format uplink control channel occupies 13 symbols of the first timeslot or subframe, the second-format uplink control channel occupies one symbol of the first timeslot or subframe, and the 13 symbols are completely different from the one symbol in the first timeslot or subframe;

the first-format uplink control channel occupies six symbols of the first timeslot or subframe, the second-format uplink control channel occupies one symbol of the first timeslot or subframe, and the six symbols are completely different from the one symbol in the first timeslot or subframe;

the first-format uplink control channel occupies four symbols of the first timeslot or subframe, the second-format uplink control channel occupies one symbol of the first timeslot or subframe, and the four symbols are completely different from the one symbol in the first timeslot or subframe; or the first-format uplink control channel occupies three symbols of the first timeslot or subframe, the second-format uplink control channel occupies one symbol of the first timeslot or subframe, and the three symbols are completely different from or partially the same as the one symbol in the first timeslot or subframe.

* * * * *